United States Patent [19]

Takahashi et al.

[11] Patent Number: 5,652,881
[45] Date of Patent: Jul. 29, 1997

[54] STILL PICTURE SEARCH/RETRIEVAL METHOD CARRIED OUT ON THE BASIS OF COLOR INFORMATION AND SYSTEM FOR CARRYING OUT THE SAME

[75] Inventors: Masamitsu Takahashi, Hadano; Kunihiro Yanagi, Sagamihara; Noriyuki Iwai, Yokohama, all of Japan

[73] Assignee: Hitachi, Ltd., Tokyo, Japan

[21] Appl. No.: 346,301

[22] Filed: Nov. 23, 1994

[30] Foreign Application Priority Data

Nov. 24, 1993 [JP] Japan .................................. 5-293426

[51] Int. Cl.$^6$ ............................ G06F 17/30; G06F 15/00
[52] U.S. Cl. .......................... 395/615; 375/603; 375/605; 375/613; 382/162; 382/165; 382/181; 382/305; 358/403
[58] Field of Search ....................... 395/600, 615, 395/613, 603, 605; 358/403; 364/DIG. 1; 382/162, 165, 181, 305

[56] References Cited

U.S. PATENT DOCUMENTS

| | | | |
|---|---|---|---|
| 4,742,558 | 5/1988 | Ishibashi et al. | 382/56 |
| 4,823,196 | 4/1989 | Goddard | 358/310 |
| 4,931,929 | 6/1990 | Sherman | 364/401 |
| 5,053,956 | 10/1991 | Donald et al. | 364/401 |
| 5,155,774 | 10/1992 | Numagami | 382/1 |
| 5,182,635 | 1/1993 | Nakashima et al. | 358/12 |
| 5,274,463 | 12/1993 | Matsumoto et al. | 358/335 |
| 5,335,084 | 8/1994 | Munemasa et al. | 358/403 |
| 5,363,203 | 11/1994 | Tahara et al. | 358/403 |
| 5,381,158 | 1/1995 | Takahara et al. | 345/156 |
| 5,446,709 | 8/1995 | Mukai | 369/32 |
| 5,509,111 | 4/1996 | Hong et al. | 395/131 |
| 5,586,197 | 12/1996 | Tsujimura et al. | 382/162 |

OTHER PUBLICATIONS

"A Similarity Retrieval Method for Image Databases using Simple Graphics", pp. 149–154, Aug. 29, 1988, T. Hamano, IEE Worshop on Languages for Automation.

"Querying Image Databases using Computed Texture Features", IBM Technical Disclosure Bulletin, vol. 36, No. 6B, Jun. 1993, pp. 207–208.

Primary Examiner—Thomas G. Black
Assistant Examiner—Jean R. Homere
Attorney, Agent, or Firm—Antonelli, Terry, Stout & Kraus, LLP

[57] ABSTRACT

Still picture search/retrieval method and system for retrieving a still picture without omission by extracting representative color component from a location of the still picture which includes a thing for search. A search condition input processing module receives color information constituting a search condition via an input unit. A still picture dividing method determination processing module receives via the input unit a method for dividing the still picture into rectangular meshes of a same size. A divided mesh designation processing module receives designation of a mesh for search from those resulting from the division. Still picture information is read out from a database for dividing each still picture into meshes by a still picture division processing module. A representative color component extraction processing module extracts a color component having the highest frequency of histogram within the search-destined mesh. A search execution processing module evaluates the representative color component to determine an evaluation value. A still picture having the evaluation value exceeding a threshold value is retrieved as the search result. The retrieved still picture is displayed on a display unit through a searched still picture display processing module.

11 Claims, 20 Drawing Sheets

| ID NUMBER | REPRESENTATIVE GRADATION |
|---|---|
| 0 | 0 |
| 1 | 50 |
| 2 | 100 |
| 3 | 150 |
| 4 | 200 |
| 5 | 256 |

FIG.4

| ID NUMBER 104 | R-COMPONENT 106 | G-COMPONENT 108 | B-COMPONENT 110 |
|---|---|---|---|
| | | | |

| R 112 | G 114 | B 116 |
|---|---|---|
| | | |

| NUMBER OF DIVISIONS HEIGHTWISE 118 | NUMBER OF DIVISIONS WIDTHWISE 120 |
|---|---|
| | |

| ID NUMBER 122 | START POINT 124 | END POINT 126 |
|---|---|---|
| 0 | 0 | 25 |
| 1 | 25 | 75 |
| 2 | 75 | 125 |
| 3 | 125 | 175 |
| 4 | 175 | 225 |
| 5 | 225 | 256 |

~23

| ID NUMBER | R-COMPONENT | G-COMPONENT | B-COMPONENT |
|---|---|---|---|
| 0 | 0 | 1 | 1 |
| 1 | 0 | 0.4 | 0.4 |
| 2 | 0 | 0 | 0 |
| 3 | 0 | 0 | 0 |
| 4 | 0.4 | 0 | 0 |
| 5 | 1 | 0 | 0 |

FIG.21
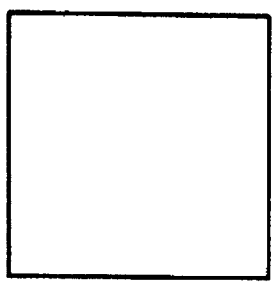
h = 1, w = 1
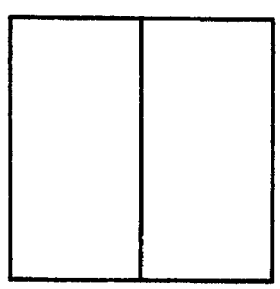
h = 1, w = 2
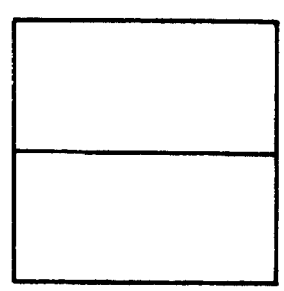
h = 2, w = 1
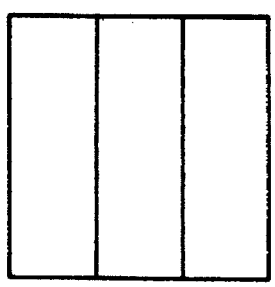
h = 1, w = 3
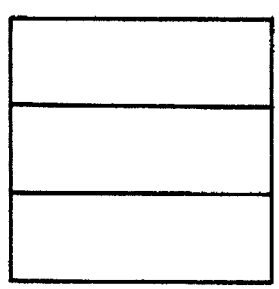
h = 3, w = 1
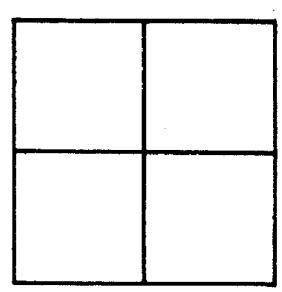
h = 2, w = 2
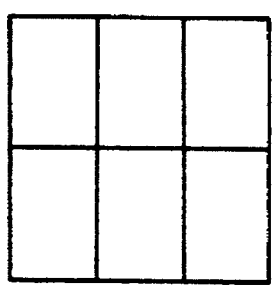
h = 2, w = 3
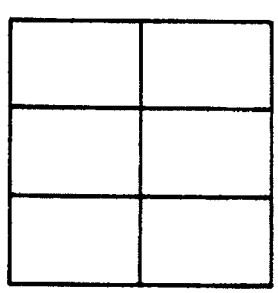
h = 3, w = 2
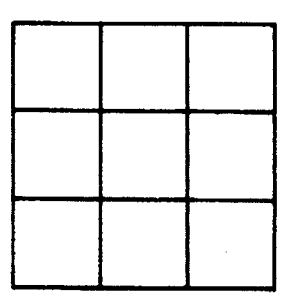
h = 3, w = 3

FIG. 26

STILL PICTURE SEARCH/RETRIEVAL METHOD CARRIED OUT ON THE BASIS OF COLOR INFORMATION AND SYSTEM FOR CARRYING OUT THE SAME

BACKGROUND OF THE INVENTION

The present invention relates to a still picture search/retrieval method for searching and retrieving a still picture from a database which stores a plurality of still pictures as data. The invention is also concerned with a still picture search/retrieval apparatus or system for carrying out the method.

In an extended database such as a so-called multi-media database which is capable of handling plural types or species of data such as characters, sound, still pictures and others, there may arise such a situation in which search or retrieval of only the sound and/or still pictures exclusive of the character string data is demanded. In such multi-media database, character strings indicative of features of the data to be stored are entered in an index table or field of the database as keywords which can serve as the keys upon performing the search. In the case of the still picture data, shapes or geometrical patterns, names, colors and the like are often used as the keywords.

By way of example, a still picture search/retrieval method based on the color is disclosed in JP-A-3-262079. According to this prior art method, when still picture data are to be stored in a database, a region of each still picture is designated and a representative color component of that region is determined. The representative color component data thus determined is additionally registered in an index field or table of the database upon storage of the still picture data. On the other hand, when a still picture of a color concerned is to be retrieved, a list of color samples extracted from all the still picture data stored in the database is displayed. By designating the color component of the color concerned by referencing the color sample list, the still picture having the color component as designated is retrieved to be displayed. In brief, this prior art still picture search method resides in that color components are extracted from the still pictures and the search of the still picture concerned is performed on the basis of the color components as extracted.

The conventional still picture search/retrieval methods such as mentioned above however suffer from numerous problems to be solved.

First, the still picture can not be searched with a color other than that of the region designated and registered previously. By way of concrete example, let's suppose a still picture depicting "a person putting on a red hat and wearing a white suit". When this still picture is registered in the database with the region covering "red hat", the still picture can not be retrieved with any other color than "red". In other words, it is impossible to search and retrieve the still picture with the color of the suit even when it is desired.

Further, since the keyword based on the color is registered as the index in the database, the amount of data stored in the database increases correspondingly, which is of course unfavorable from the standpoint of economy.

Besides, it is noted that the colors having color components differing from one another more or less are very difficult for the searcher to visually discern discriminatively. Consequently, when a still picture is to be searched and retrieved with only "pure red" having the R-, G- and B-primary color components of "256", "0" and "0", respectively) as the color of concern, it is practically impossible to discriminate the color "pure red" from a color "reddish" (i.e., nearly or approximately red). In this way, with the still picture search/retrieval method known heretofore according to which a region of a still picture is designated and the representative color component extracted from that region is registered upon storage of the still picture in a database, the still picture can be searched only with the color of the region designated and registered beforehand, to serious inconvenience.

Additionally, because the search is performed by checking actually the colors contained in the color samples for thereby selecting the color of concern, the still picture search/retrieval which tolerates more or less difference in the color is difficult to carry out.

SUMMARY OF THE INVENTION

In the light of the state of the art described above, it is an object of the present invention to provide a still picture search/retrieval system which can positively exclude the possibility of omission of a still picture from the search due to impossibility of extracting a representative color component of a thing of concern as a representative color of the whole still picture.

A second object of the present invention is to provide a still picture search/retrieval system which can decrease significantly the amount of data required for storing a still picture in a database.

A third object of the present invention is to provide a still picture search/retrieval system which is capable of handling quantitatively the color by itself without need for defining definitely the color and which allows the color inputted as a search condition to be determined with flexibility by tempering a search procedure with fuzziness or ambiguity.

A fourth object of the present invention is to provide a still picture search/retrieval system in which when the search results in retrieval of plural still pictures, a still picture satisfying most approximately the search condition designated in terms of color by a searcher can be determined and selected without difficulty.

It is yet another object of the present invention to provide still picture search/retrieval methods carried out by the systems mentioned above.

In view of the above and other objects which will become apparent as the description proceeds, there is provided according to an aspect of the present invention a still picture search/retrieval system for selectively searching a particular still picture of concern from a plurality of still pictures stored in database on the basis of a color designated as search condition and displaying the particular still picture retrieved through the search, which system includes an input unit for inputting color data-related information concerning a color designated as search condition for execution of the search and region-related information concerning a region of each of the still pictures designated for the search, a search module for selecting from each of the still pictures a search-destined region for which the search is to be actually performed on the basis of the region-related information, determining a representative value of the color data of each of the still pictures on the basis of the color data of the selected search-destined region and deciding whether or not the representative value satisfies conditions determined on the basis of the color data-related information to thereby decide whether or not any hit still picture exists, and a display unit for displaying the hit still picture as the still picture retrieved as the result of the search.

In a preferred mode for carrying out the invention, the color data may include color component data for a plurality of color components constituting the color data, wherein the color component data are divided into a plurality of color component groups on a basis of the color component data per se. Through the input unit, fuzzy degrees representing degrees of similarity of the designated color to the color component groups, respectively, are inputted, while the search module determines the color component data corresponding to the representative value of the determined color data for deriving a fuzzy evaluation value of the representative value of the color data on the basis of the fuzzy degrees for the color component data, to thereby retrieve a particular still picture on the basis of the fuzzy evaluation value.

In another preferred mode of the invention, the still picture search/retrieval system may further include a retrieved still picture output module for outputting sequentially a plurality of still pictures, if retrieved, in a descending order of the fuzzy evaluation values, wherein the display unit displays the still pictures in a descending order of the fuzzy evaluation values.

With the above-mentioned arrangement of the still picture search/retrieval system according to the invention, it is possible, upon extraction of the representative color component, to extract as many picture elements or pixels as possible which constitute a thing of concern contained in a still picture on the basis of the information concerning the search-destined region, wherein the color components of the pixels can be used as the representative color components. In this manner, the color components of the still picture can automatically be extracted, whereby the necessity for additionally storing beforehand the keyword of the color in an index field of a database can be eliminated. This means that the amount of data required for storage of the still pictures in the database can correspondingly be decreased.

Furthermore, by virtue of such arrangement that the color component data of the representative value of the color data are determined as mentioned above and that a fuzzy evaluation value of the representative value of the aforementioned color data is determined in dependence on the degrees of fuzziness for every color component for thereby searching a particular still picture, it is possible to retrieve the still picture in the color designated or inputted as the search condition by the searcher. In that case, the color constituting the search condition can be inputted without need for defining definitely the name of color by taking into account the visual sensation which the color itself brings about and at the same time tempering the color with fuzziness of ambiguity.

Additionally, in case a plurality of still pictures have been searched, they can be displayed in the descending order of the evaluation values thereof. Thus, it can be determined which of the searched still pictures has the color approximating most closely the color designated or inputted as the search condition merely by viewing the display screen on which the still pictures are generated.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

FIG. 4 is a view illustrating a typical structure of a fuzzy grade table;

FIG. 5 is a view showing a table for storing representative RGB-values;

FIG. 6 is a view showing a table for storing still picture division information;

FIG. 7 is a view showing an exemplarily structure of a gradation division table;

FIG. 21 is a view for illustrating typical examples of division of a still picture into meshes;

FIG. 26 is a view showing examples of the evaluation table obtained as the result of execution of the processing procedure of FIG. 25;

DESCRIPTION OF THE PREFERRED EMBODIMENTS

Figure 1:
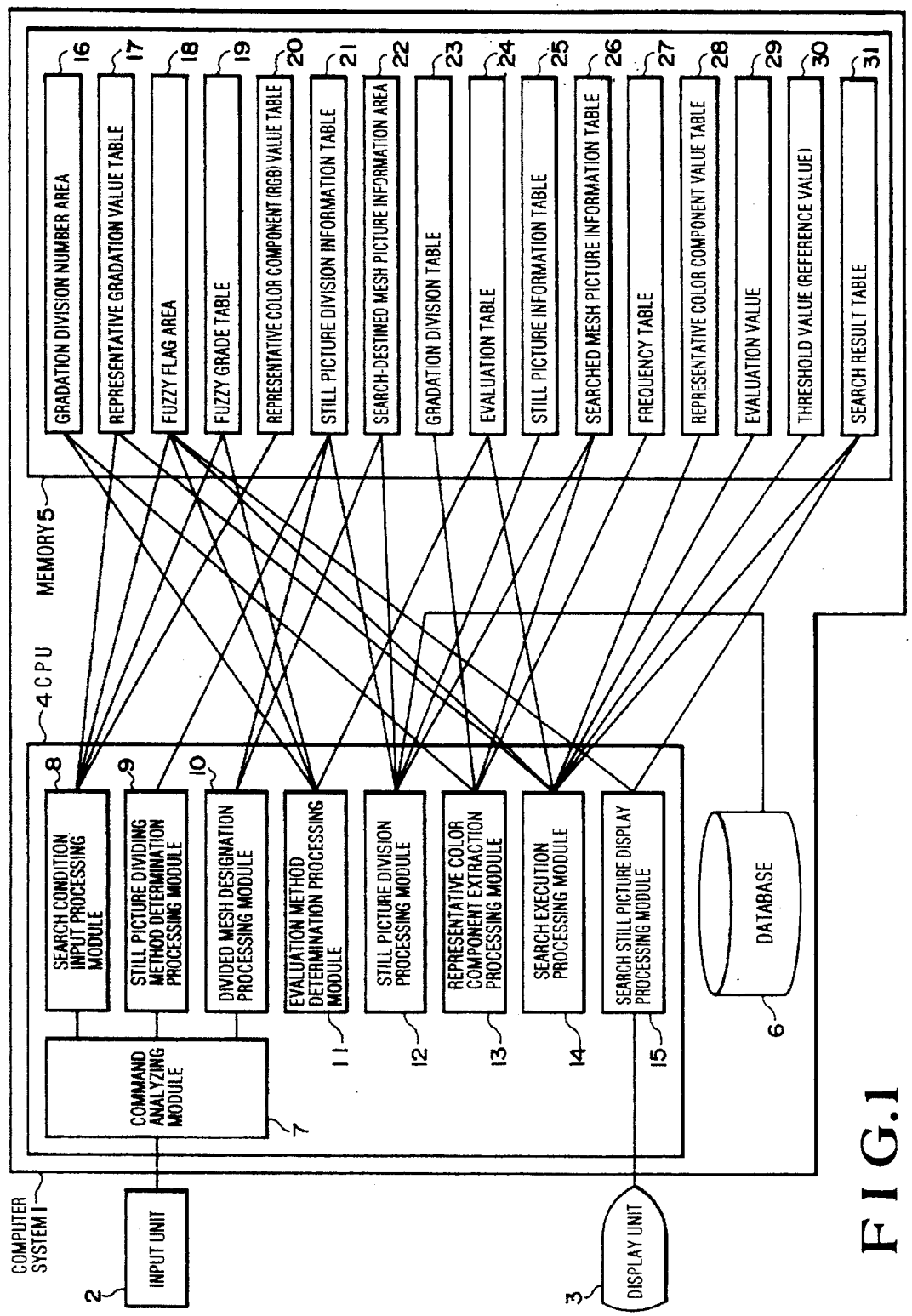
FIG. 1 is a schematic block diagram showing generally an arrangement of a still picture search/retrieval system according to an embodiment of the present invention.

Now, the present invention will be described in detail in conjunction with preferred or exemplary embodiments thereof by reference to the accompanying drawings on the assumption, only by way of example, that the teachings of the invention is applied to search and retrieval of a full-color still picture in "red". Further, in the following description, like reference characters designate like or corresponding parts throughout the several views. Also in the following description, it is to be understood that such terms as "right", "left", "vertical", "horizontal", "heightwise", "widthwise" and the like are words of convenience and are not to be construed as limiting terms.

FIG. 1 is a schematic block diagram showing generally an arrangement of a computer system 1 which is so implemented as to be capable of carrying out a still picture search/retrieval method according to an embodiment of the invention. The illustrated system is comprised of an input unit 2 through which data are inputted, a display unit 3 for displaying the results of the search/retrieval, a CPU (Central Processing Unit) 4, a memory 5 and a database 6 in which still pictures are stored. The CPU 4 in turn includes a command analyzing module 7 for analyzing commands inputted through the input unit 2 to thereby distribute them to relevant parts or modules, a search condition input processing module 8 for inputting color information and a command for selection of an evaluation method which constitute search conditions (which may also be referred to as the query), a still picture dividing method determination processing module 9 for inputting a method for dividing a still picture into rectangular meshes each of a same size, a divided mesh designation processing module 10 for designating one of the divided meshes in which a thing constituting a subject for search is included (this mesh will also be referred to as the search-destined mesh or region), an evaluation method determination processing module 11 for determining an evaluation method to be adopted for the search on the basis of the search condition as inputted, a still picture division processing module 12 for dividing the still picture in accordance with a division method as inputted, a representative color component extraction processing module 13 for extracting a representative color component from the search-destined mesh, a search execution processing module 14 for evaluating the representative color component to thereby select and retrieve a still picture to be outputted as the result of the search/retrieval, and a searched still picture display processing module 15 for displaying the still picture as retrieved on the display unit 3.

Before entering into details of the processing parts or modules mentioned above, some assumptions will be made for convenience of description. It is first assumed that the still pictures of concern (i.e., those to undergo the search process) are full color pictures each having R-, G- and B-color components (primary color components) each in 256 gradation values. In this conjunction, it is noted that in the case of a full color picture, change of a color or colors by one gradation can not visually be recognized by the human being. Under the circumstances, it is contemplated with the invention to divide the 256 gradations into gradation groups or ranges each having a certain width, i.e., each including a predetermined number of gradations. To be more concrete, it is assumed in the case of the instant embodiment of the invention, by way of example only, that 256 gradation levels are divided by six to thereby represent each color with six representative gradations. Namely, the number of divisions or divisor is six with the width of the divided gradation range being fifty. Thus, a still picture can be represented by 216 colors (=6×6×6 for each of the primaries R, G and B) with the six gradations of "0", "50", "100", "150", "200" and "256". Although it is assumed in conjunction with the instant embodiment of the invention that the gradation levels are divided into six groups (i.e., divided by the divisor of "6"), it goes without saying that by selecting the width of the divided gradation range at a smaller value, difference in color can more clearly be represented.

Further, the 256 gradations of each of the color components R, G and B are divided into a number of regions which correspond to the divisor mentioned above. In that case, it is postulated that the representative gradations correspond to the divided regions, respectively, and that the six representative gradations mentioned above assume, respectively, the centers of the regions resulting from the above division. More specifically, let's represent the representative gradation by N with the gradation division width by $\Delta N$, the divided gradation regions at both ends are given, respectively, by:

$0 \leq$ Divided Gradation Region $\leq \Delta N/2$, and $(250-\Delta N/2) <$ Divided Gradation Region $\leq 256$ On the other hand, the intermediate divided gradation regions can be represented as follows:

$(N-\Delta N/2) <$ Divided Gradation Region $\leq (N+\Delta N/2)$

Figures 2, 3:
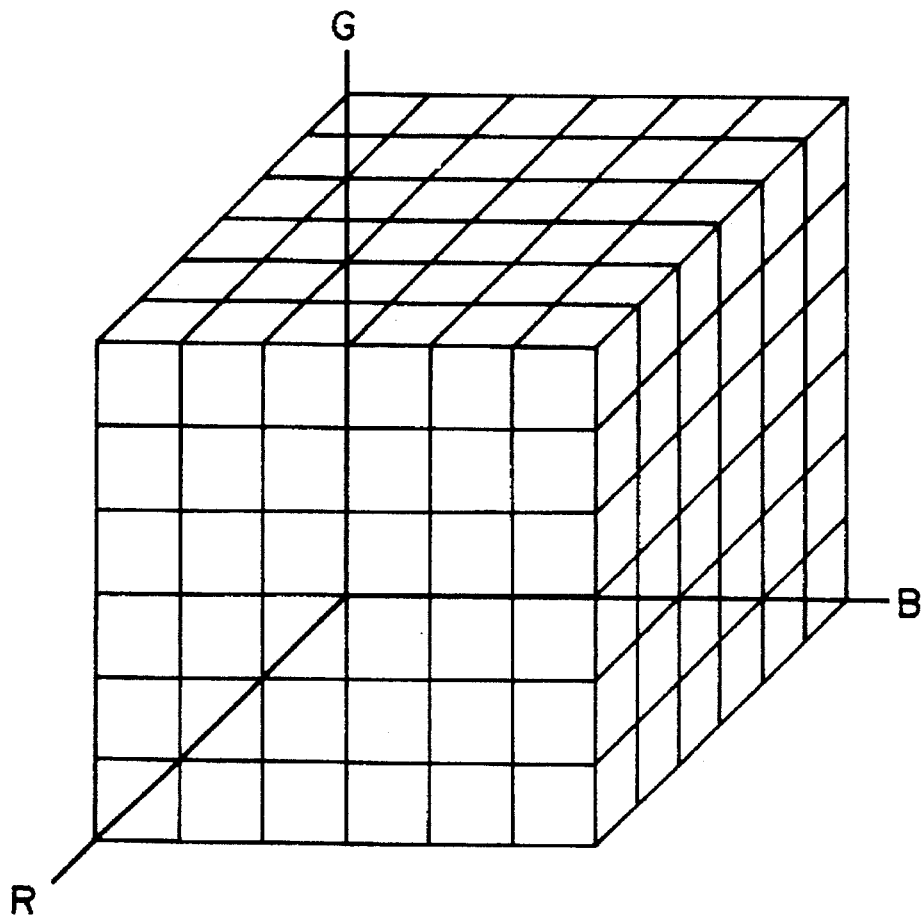
FIG. 2 is a view illustrating an RGB-color space divided into 216 regions.
FIG. 3 is a view showing a representative gradation table.

To be more concrete, division of the 256 gradation levels by six results in the gradation regions which can be defined as follows:

Representative gradation "0": $0 \leq$ Divided Gradation Region $\leq 25$
Representative gradation "50": $25 <$ Divided Gradation Region $\leq 75$
Representative gradation "100": $75 <$ Divided Gradation Region $\leq 125$
Representative gradation "150": $125 <$ Divided Gradation Region $\leq 175$
Representative gradation "200": $175 <$ Divided Gradation Region $\leq 225$
Representative gradation "256": $225 <$ Divided Gradation Region $\leq 256$ By dividing the gradation values in this manner, the RGB-color space can be divided into 216 (=6×6×6) regions, as illustrated in FIG. 2.

Now, description will be directed to values and tables stored in the memory 5.

Figure 8:
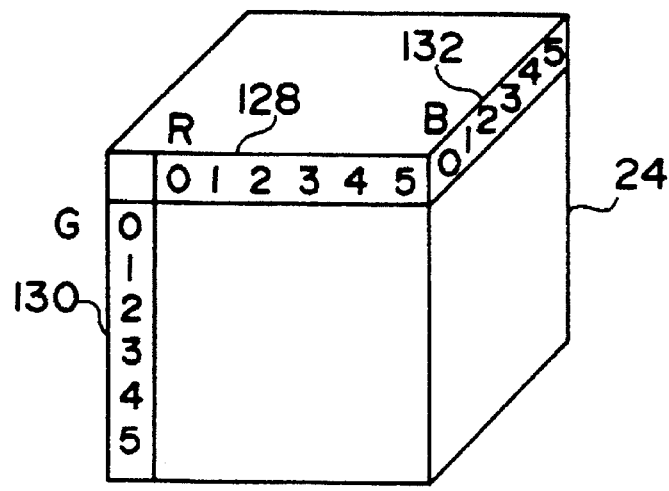
FIG. 8 is a view showing exemplarily an evaluation table.
Figure 9:
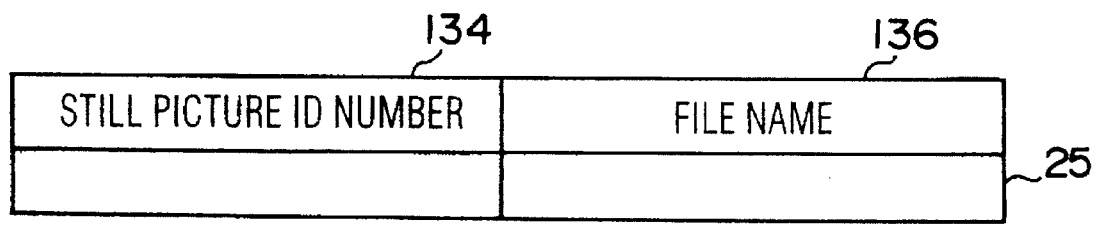
FIG. 9 is a view showing exemplarily a table for storing still picture information.
Figure 10:
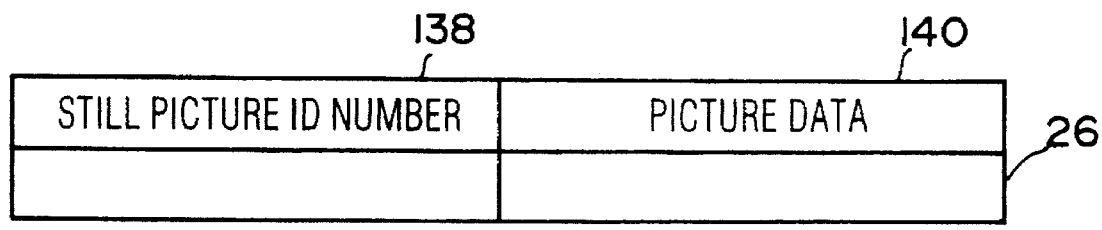
FIG. 10 is a view showing a table for storing searched mesh picture information.
Figure 11:
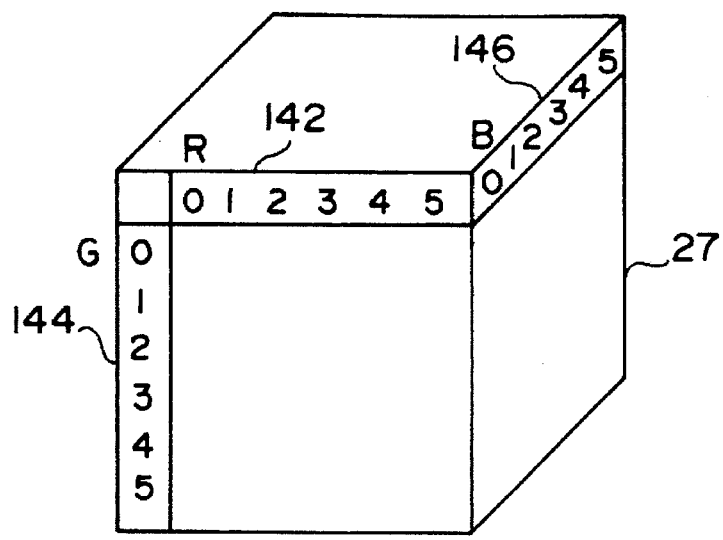
FIG. 11 is a view showing a structure of a frequency table.
Figure 12:
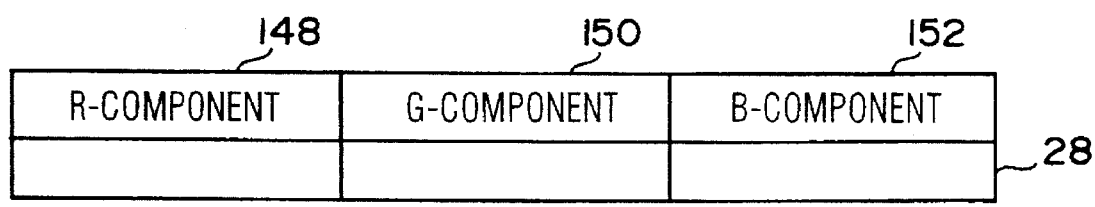
FIG. 12 is a view showing a representative color component value.

Turning back to FIG. 1, a reference numeral 16 denotes a gradation division number area for storing the number of division of the gradations in the manner described above. In the case of the instant embodiment under consideration, the number of division (divisor) "6" is stored in the gradation division number area 16. A representative gradation table 17 is provided for storing the representative gradation values. FIG. 3 shows a format of this table. As can be seen in this figure, the representative gradation value table 17 has an identifier number column 100 for storing the identifier numbers and a representative gradation value column 102 for containing the representative gradation values determined in the manner elucidated previously. In the case of the instant embodiment, the six representative gradation levels mentioned above are stored beforehand in the table 17. A reference numeral 18 designates a fuzzy flag area for storing a flag indicating whether a fuzzy inference is to be employed or not in order to allow a still picture of color close to a desired color to be retrieved through the search. When the fuzzy inference is to be resorted to, the fuzzy flag area 18 is placed with logic "1", indicating that the fuzzy flag is set "ON", while when the fuzzy inference is not used, the fuzzy flag is placed with logic "0", i.e., the fuzzy flag is set "OFF". A reference numeral 19 denotes a fuzzy grade table which is referenced when the fuzzy inference is used and which stores fuzzy grades of individual color components as inputted. A typical structure of the fuzzy grade table 19 is illustrated in FIG. 4. As can be seen in the figure, the fuzzy grade table 19 is composed of an identifier number column 104 for containing identifier numbers, an R-color component fuzzy grade value column 106, a G-color component fuzzy grade value column 108 and a B-color component fuzzy grade value column 110. A reference numeral 20 denotes a representative color component (RGB) value table which is adapted to store the gradation values inputted for indicating the representative color components when the fuzzy inference is not used. A typical structure of the representative color component value table 20 is illustrated in FIG. 5. As can be seen in the figure, the representative color component (RGB) value table 20 is composed of an R-color component value column 112, a G-color component value column 114 and a B-color component column 116. A reference numeral 21 denotes a still picture division information table which is adapted to store the number of division or divisors in vertical (heightwise) and horizontal (widthwise) directions, respectively, which are used in dividing a still picture. A structure of the still picture division information table 21 is illustrated in FIG. 6. As can be seen in the figure, the still picture division information table 21 has a column 118 for storing the number of divisions (or divisor) in the vertical direction and a column 120 for storing the number of divisions in the horizontal direction. A reference numeral 22 denotes a search-destined mesh picture information area for storing the identifier number of a location of the mesh as designated. A numeral 23 denotes a gradation division table for storing gradation values at a start point and an end point, respectively, in each of several ranges into which the color component gradations are to be divided. This table is referenced upon dividing the color component gradation levels into several groups or regions, as mentioned hereinbefore. An exemplary structure of the gradation division table 23 is shown in FIG. 7. The gradation division table 23 contains an identifier number column 122, a gradation value column 124 for storing the gradation values at the start points of the divided ranges and a gradation value column 126 for storing the gradation values at the end points, respectively. In the case of the instant embodiment of the invention, the values resulting from the division mentioned hereinbefore are previously stored in the gradation division table 23. A reference numeral 24 denotes an evaluation table for storing Cartesian products of the fuzzy sets as inputted. A typical structure of the evaluation table 24 is illustrated in FIG. 8. As can be seen therefrom, the evaluation table 24 is implemented in a three-dimensional divisor matrix comprised of an R-color component row 128, a G-color component column 130 and a B-color component row 132. A reference numeral 25 denotes a still picture information table which is designed for storing file names (or identifiers) of still pictures read out from the data-base 6 and which contains a database-oriented still picture identifier numbers 134 specific to the still pictures, respectively, (i.e., unique identifier numbers of the still pictures within the database managed internally of the system) and a user-oriented still picture data file identifier numbers 136 (i.e., unique identifiers or names of the still pictures managed by the user), as shown in FIG. 9. A reference numeral 26 denotes a searched mesh picture information table for storing picture data of the search-destined mesh region cut out from the still picture data mentioned previously. A typical structure of the search-destined mesh picture information table 26 is illustrated in FIG. 10. As can be seen in the figure, the search-destined mesh picture information table 26 contains a still picture identifier number 138 unique to a still picture of concern, and picture data 140 of the search-destined mesh region. A reference numeral 27 denotes a frequency table which is destined for storing histogram values and which is implemented in a three-dimensional matrix including an R-color component row 142, a G-color component column 144 and a B-color component row 146, as illustrated in FIG. 11. Furthermore, a reference numeral 28 denotes a representative color component value table which is designed for storing the gradation values of the representative color components (R, G, B) and contains an R-color component value 148, a G-color component value 150 and a B-color component value 152, as illustrated in FIG. 12.

Figure 13:
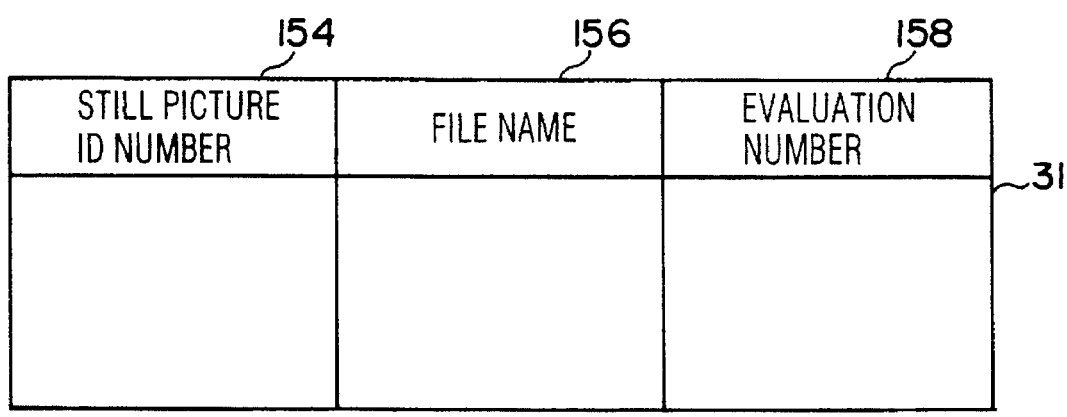
FIG. 13 is a view showing a structure of a search result table.

Further, there is provided an area for storing values (i.e., evaluation values 29) which correspond to the representative color component values 28 and which are read out from the evaluation table 24, although illustration is omitted. Besides, an area is also provided in the memory 5 for storing a value (threshold value 30) used as a reference for the search, which value is previously determined internally of the system. Moreover, a search result table 31 is provided for storing the results of the search or retrieval. This table contains still picture identifier numbers 154, still picture file names 156 and evaluation values 158 specific to the still pictures, respectively, as shown in FIG. 13.

Figure 14:
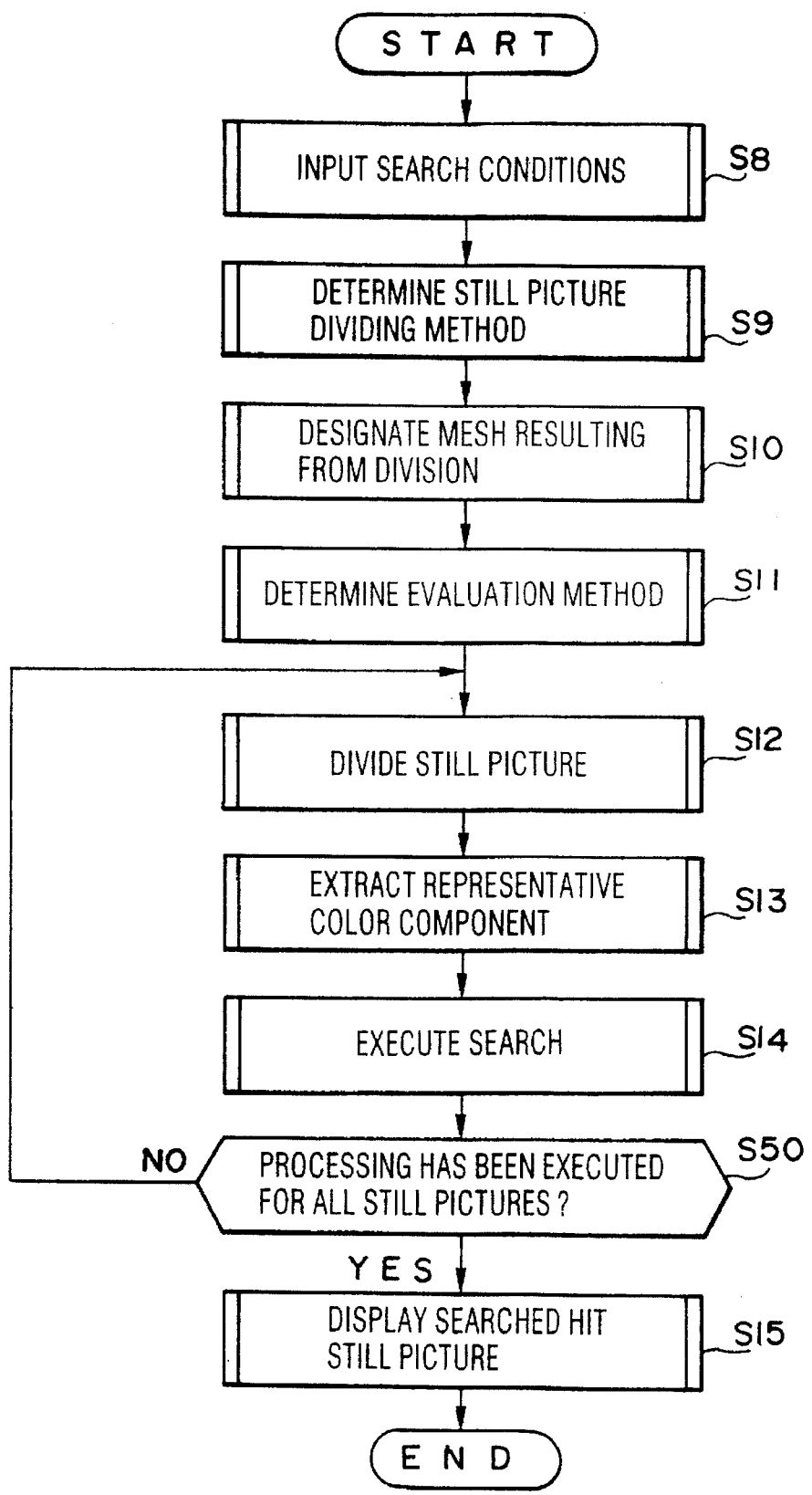
FIG. 14 is a flow chart for illustrating a processing procedure involved in the still picture search/retrieval according to an embodiment of the invention.

FIG. 14 is a flow chart for illustrating a processing procedure involved in the still picture search and retrieval.

Now, description will be made of operations or functions of the individual processing modules implemented in the CPU 4 by reference to the flow chart shown in FIG. 14.

In a step S8 executed by the search condition input processing module 8, operator or searcher can input color information representing the search condition through the input unit 2. In succession, in a step S9 executed by the still picture dividing method determination processing module 9, the operator inputs through the input unit 2 a method for dividing the still picture into rectangular meshes each of a same size. In a step S10 executed by the divided mesh designation processing module 10, the mesh containing the thing of concern is designed with the aid of the input unit 2. In a step S11 executed by the evaluation method determination processing module 11, the evaluation method to be resorted to for searching is determined on the basis of the inputted color information constituting the search condition. The steps S8 to S11 mentioned above constitute a preprocessing procedure. In succession, still pictures are taken out from the database 6, whereon processings described below are executed for each of the still pictures. More specifically, in a step S12 executed by the still picture division processing module 12, the still picture read out from the database 6 is divided in accordance with the division method determined by the still picture dividing method determination processing module 9 (step S9), to thereby cut out the picture information contained in the mesh region of concern as determined by the divided mesh designation module 10. Subsequently, in a step S13 executed by the representative color component extraction processing module 13, the representative color component of the original still picture is extracted from the picture information contained in the mesh region of concern cut out in the step S10. Next, in a step S14 executed by the search execution processing module 14, the evaluation value of the representative color component is determined in accordance with the evaluation method determined in the step S11. When the evaluation value is not smaller than a threshold value (reference value) determined previously, the corresponding picture information is outputted as the result of the search. The processing steps S12, S13 and S14 are carried out for all the still pictures. Upon completion of these processings, the searched still picture display processing module 15 is activated to display the still pictures as searched or retrieved on the display unit 3.

The processings briefed above will now be described each in more detail.

Figures 15, 16:
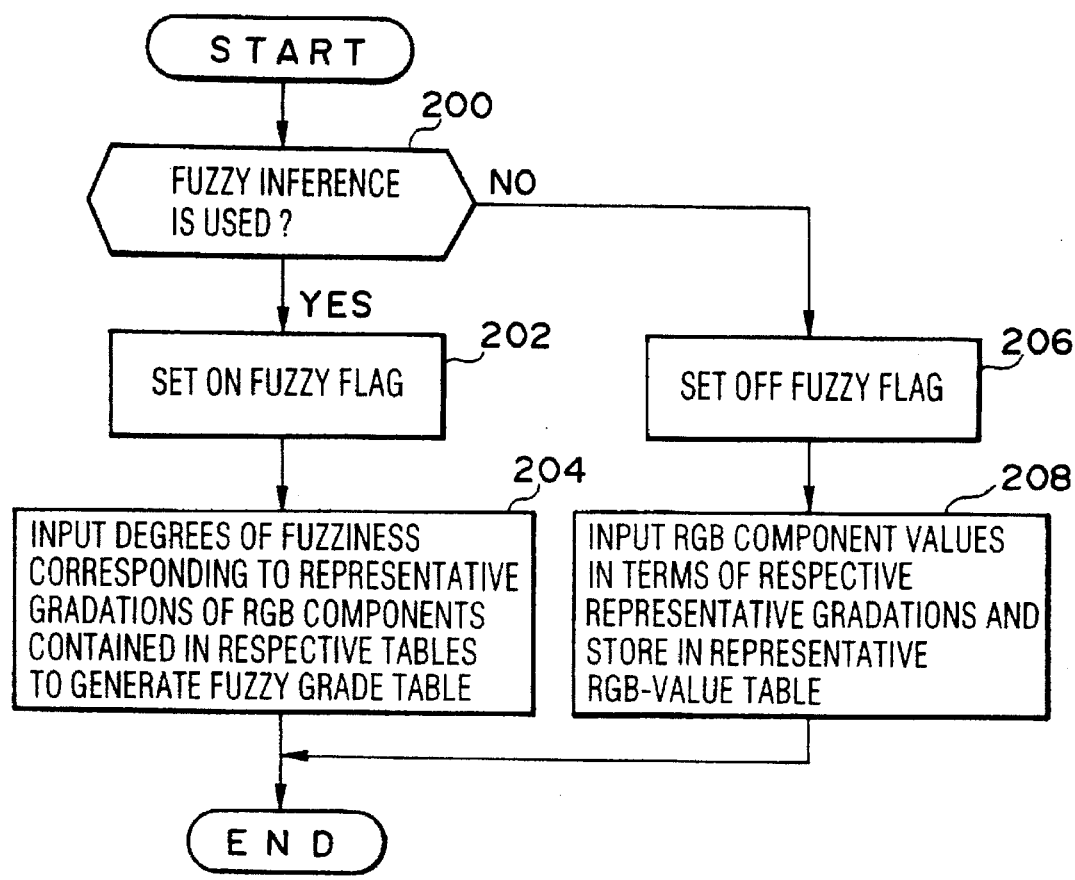
FIG. 15 is a flow chart for illustrating a search condition input processing procedure.
FIG. 16 is a view showing exemplarily a structure of a fuzzy grade table.

FIG. 15 is a flow chart for illustrating the processing executed by the search condition input processing module 8. At first, it is decided in a step 200 whether or not the fuzzy inference is to be resorted to. In the case where the fuzzy inference is to be used, the fuzzy flag stored in the fuzzy flag area 18 is set on (logic "1" state) in a step 202. Subsequently, degree of similarity or closeness of the representative gradation values 102 contained in the representative gradation value table 17 to the color of concern (i.e., color designated as the search condition) is inputted for each of the R-, G- or B-color components in terms of fuzzy grade values (i.e., degrees of fuzziness). These values are stored as the R-color component fuzzy grade value 106, the G-color component fuzzy grade value 108 and the B-color component fuzzy grade value 110, respectively, in the fuzzy grade table 19 shown in FIG. 16 in a step 204. Unless the fuzzy inference is used, the fuzzy flag mentioned above is set to off (i.e., logic "0" state) in a step 206, and the color constituting the search condition is inputted as the representative gradation value which is then stored in the representative color component value table 20 (step 208).

At this juncture, it should be mentioned that the fuzzy grade value as inputted defines quantitatively the degree of approximation or closeness to the color of concern designated as the search condition according to the subjective viewpoint of the searcher or operator. By way of example, let's assume that the search condition (or query) is given in terms of "pure red" (i.e., R-, G-, B-color components of "256", "0" and "0", respectively). On the presumption that the 256 gradation levels of the color components are divided into six groups, as mentioned hereinafter, degrees of approximation (closeness) to "red" are given by values in a range from "0" to "1" for the six representative gradation levels of "0", "50", "100", "150", "200" and "256". In that case, as the gradation level of the color "red" is closer to "256", the former approximates closely the R-color component. Thus, in this case, the grade value of the gradation "256" is set equal to "1". At the gradation level of "200", the color of concern can passably be perceived as "red". Accordingly, the grade value is set to "0.4". On the other hand, as the gradation becomes smaller than "200", the color of concern can scarcely be perceived as "red". Thus, the grade value is set to "0". By contrast, the G- and B-color component can hardly be perceived as "red" when the gradations thereof are close to "256". Accordingly, for the G- and B-color components, the corresponding grade value for the gradation of "0" is set equal to "1" with the grade value for the gradation of "50" being set as "0.4", while for the gradations exceeding "50", the grade value is set to "0". Upon inputting the fuzzy grade values, the searcher can determine the grade value while displaying color states on the display unit by varying the gradations for the R-, G- and B-color components at his or her will. In this manner, the searcher can determine the degrees of the color components by himself or herself through the fuzzy inference process and input the degrees as the fuzzy grades. As a result of this, there is generated the fuzzy grade table 19 of such contents as illustrated in FIG. 16.

Now, let's represent the perception "it is red" by "R", the perception "it is green" by "G" and the perception "it is blue" by "B". Then, fuzzy sets for "R", "G" and "B" may be expressed as follows:

$$R = \int \mu R(x)/x$$

where $$\mu R(x) = [\text{R-component gradation}] \ (0, 0, 0, 0, 0.4, 1),$$

$$G = \int \mu G(y)/y$$

where $$\mu G(y) = [\text{G-component gradation}] \ (1, 0.4, 0, 0, 0, 0),$$

$$B = \int \mu B(z)/z$$

where $$\mu B(z) = [\text{B-component gradation}] \ (1, 0.4, 0, 0, 0, 0)$$

In the above expressions,

[R-component gradation]=[x: 0, 50, 100, 150, 200, 256],

[G-component gradation]=[y: 0, 50, 100, 150, 200, 256],

[B-component gradation]=[z: 0, 50, 100, 150, 200, 256]

With the enumeration-type fuzzy membership functions, the following expressions can apply valid:

$$\mu R(x) = \{x: 0/0 + 0/50 + 0/100 + 0/150 + 0.4/200 + 1/256\},$$

$$\mu G(y) = \{y: 1/0 + 0.4/50 + 0/100 + 0/150 + 0/200 + 0/256\},$$

$$\mu B(z) = \{z: 1/0 + 0.4/50 + 0/100 + 0/150 + 0/200 + 0/256\}$$

Figure 17:
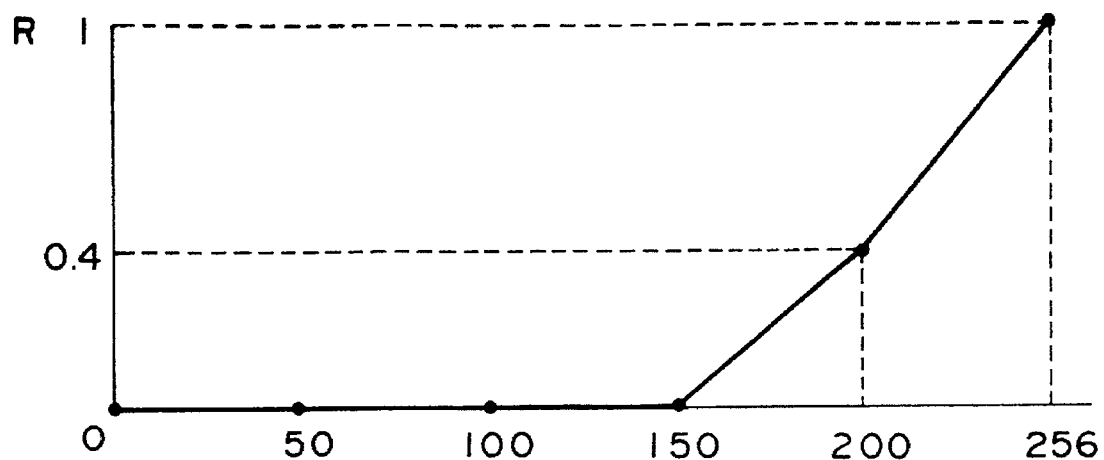
FIG. 17 is a view for illustrating an R-color component of "red" in terms of a fuzzy membership function.
Figure 18:
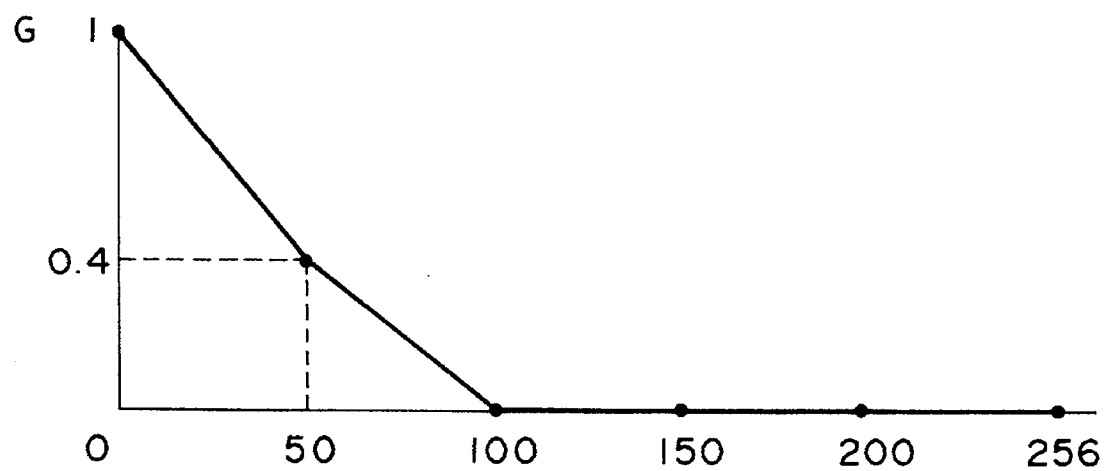
FIG. 18 is a view for illustrating a G-color component of "red" in terms of a fuzzy membership function.
Figure 19:
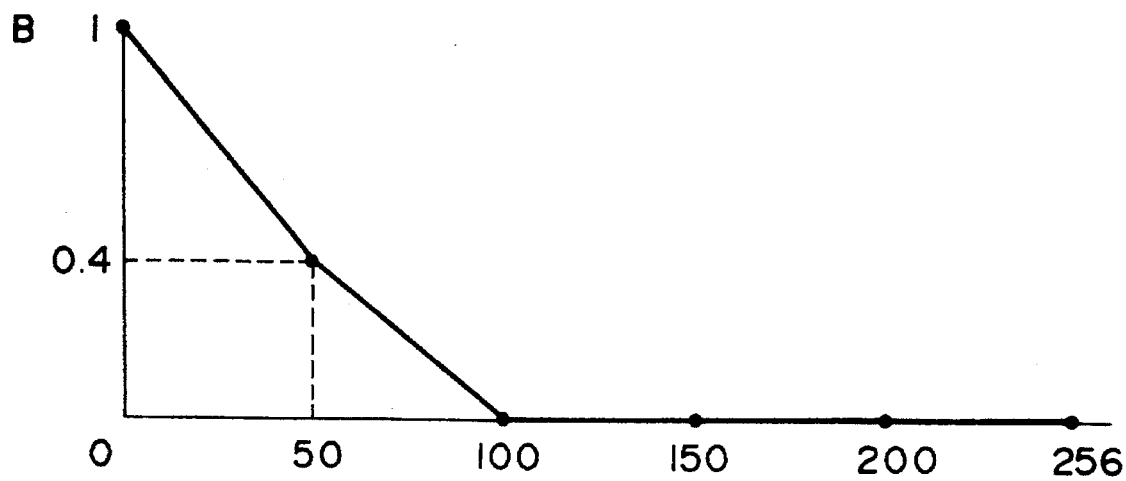
FIG. 19 is a view for illustrating a B-color component of "red" in terms of a fuzzy membership function.

Thus, with the fuzzy membership functions, the R-, G- and B-color components can be illustrated in such manners as shown in FIGS. 17, 18 and 19, respectively.

Figure 20:
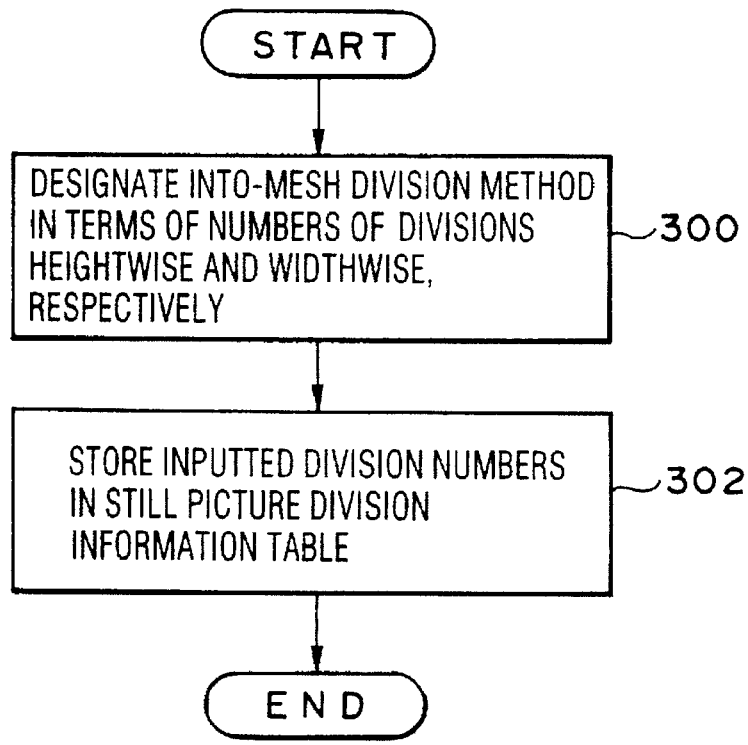
FIG. 20 is a flow chart for illustrating a still picture dividing method determination processing procedure.

FIG. 20 is a flow chart for illustrating the processing executed by the still picture dividing method determination processing module 9. Referring to the figure, the operator or searcher designates the method of dividing the still picture of concern into the meshes in terms of the number of divisions (divisors) in the vertical and horizontal directions h and w (i.e., numbers of divisions in the heightwise direction and the widthwise direction), respectively, in a step 300. The vertical and horizontal divisors are stored in the vertical divisor column 118 and the horizontal divisor column 120, respectively, of the still picture division information table 21 (FIG. 6) in a step 302. Typical examples of the division of a still picture into meshes are illustrated in FIG. 21.

Figure 22:
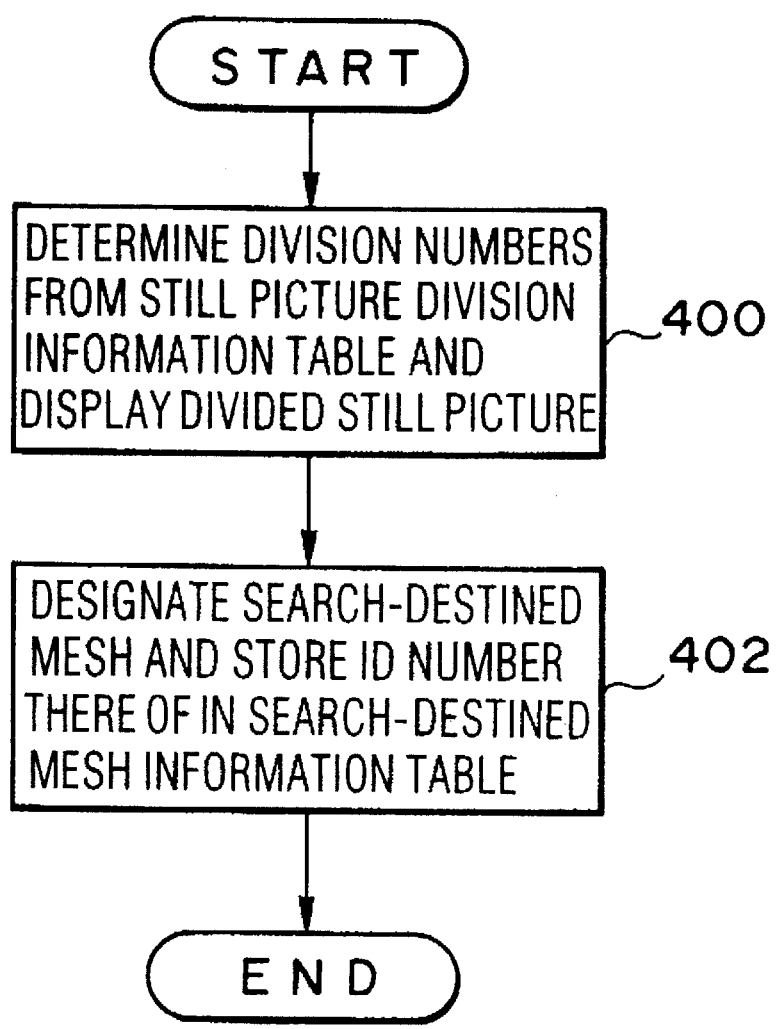
FIG. 22 is a flow chart for illustrating a divided mesh designation processing procedure.
Figure 23:
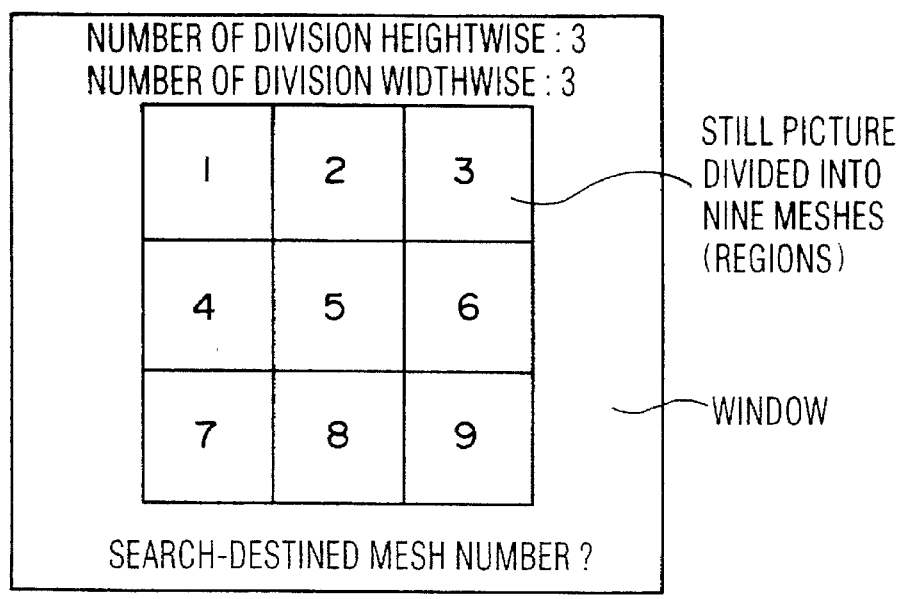
FIG. 23 is a view for illustrating, by way of example only, division of a still picture into nine meshes with a center mesh being designated for search.

FIG. 22 is a flow chart for illustrating the processing executed by the divided mesh designation processing module 10. Referring to the figure, the operator designates the mesh containing a thing of concern included in the still picture. In the first place, by referencing the still picture division information table 21, the number of divisions (divisor) is determined for the still picture, whereby an image of the divided still picture is displayed on the display unit 3 in a step 400. The meshes or regions of the divided still picture being displayed are numbered from the top left corner to the right and toward the bottom, respectively, as can be seen in FIG. 23. The operator inputs the identifier number of the mesh to be designated, whereby the identifier number is stored in the search-destined mesh picture information area 22. Parenthetically, in the case of an example of the still picture division illustrated in FIG. 23, the still picture is partitioned into nine regions or meshes where the vertical (heightwise) divisor h is "3" and the horizontal (widthwise) divisor w is "3".

Figure 24:
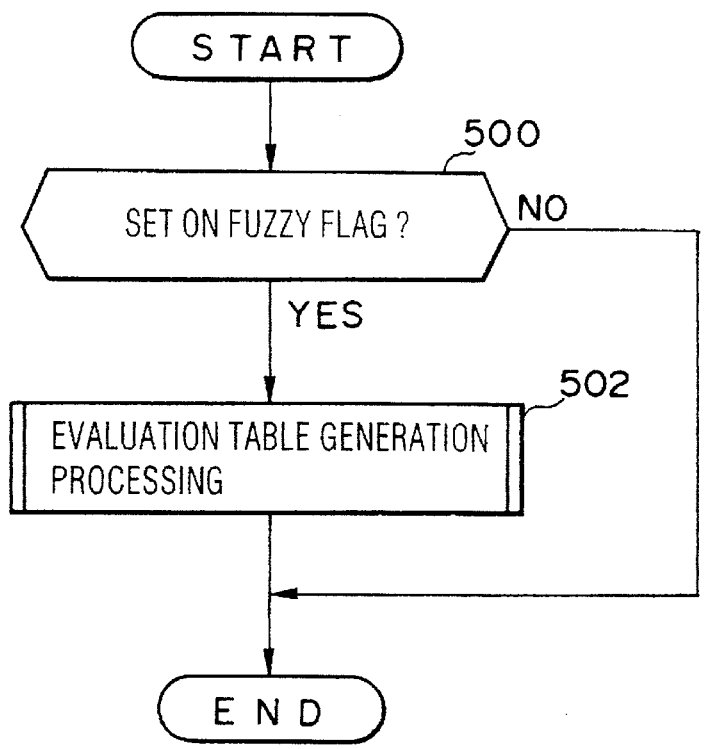
FIG. 24 is a flow chart for illustrating an evaluation method determination processing procedure.

FIG. 24 is a flow chart for illustrating the processing executed by the evaluation method determination processing module 11. When the fuzzy flag is set off, the processing is terminated without any thing done. On the other hand, when the fuzzy flag is set on, an evaluation table creation processing is performed in a step 500. The evaluation table creation processing is to create or generate the evaluation table 24 for deciding whether or not each of the still pictures stored in the database 6 satisfies the search conditions on the basis of the inputted fuzzy set mentioned previously (step 502).

Before entering into description of the evaluation table creation or generation processing procedure, the concept underlying the evaluation mentioned above will be explained.

The three fuzzy sets of the R-, G- and B-color components are independent of one another. A color can be represented by a combined set of these three fuzzy sets. Accordingly, let's consider a combined set which can be expressed by "R AND G AND B". This set can be expressed by a Cartesian product of minimum grade values of the components R, G and B. More specifically, the Cartesian product of the R-, G- and B-color components (i.e., R×G×B) can be expressed as follows:

$$R \times G \times B = \int \mu R(x) \wedge \mu G(y) \wedge \mu B(z)/(x,y,z)$$
$$= \int \mu R \times G \times B(x,y,z)/(x,y,z)$$

Thus, describing combinations of the individual components in the form of a (corresponding) matrix, there can be derived a three-dimensional matrix having 216 components or elements. This means that for all the combinations of the fuzzy grade values of the R-, G- and B-fuzzy sets, a matrix is defined by smallest values of the three fuzzy grade values.

Figure 25:
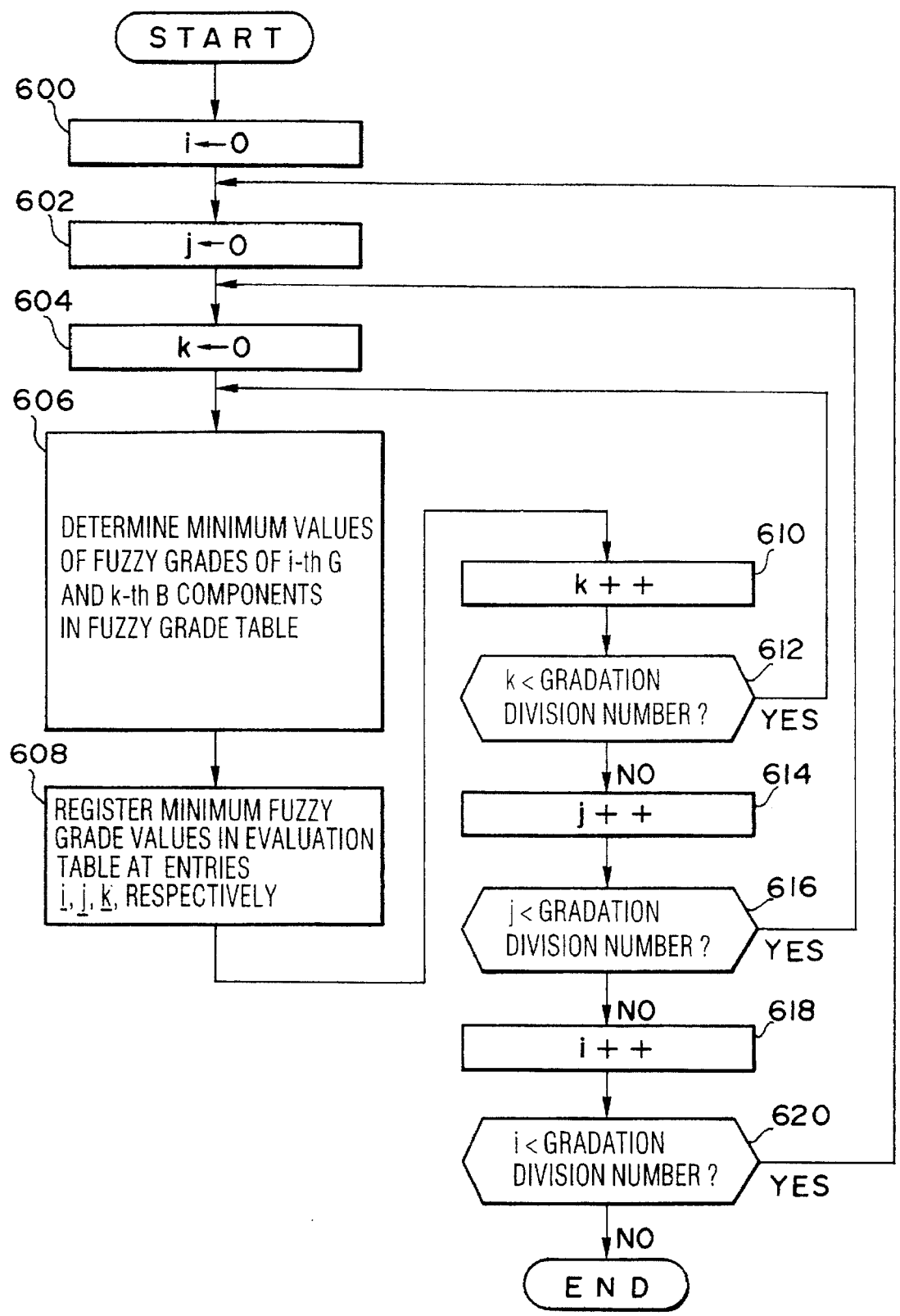
FIG. 25 is a flow chart for illustrating an evaluation table generation or creation processing procedure.
Figure 26:
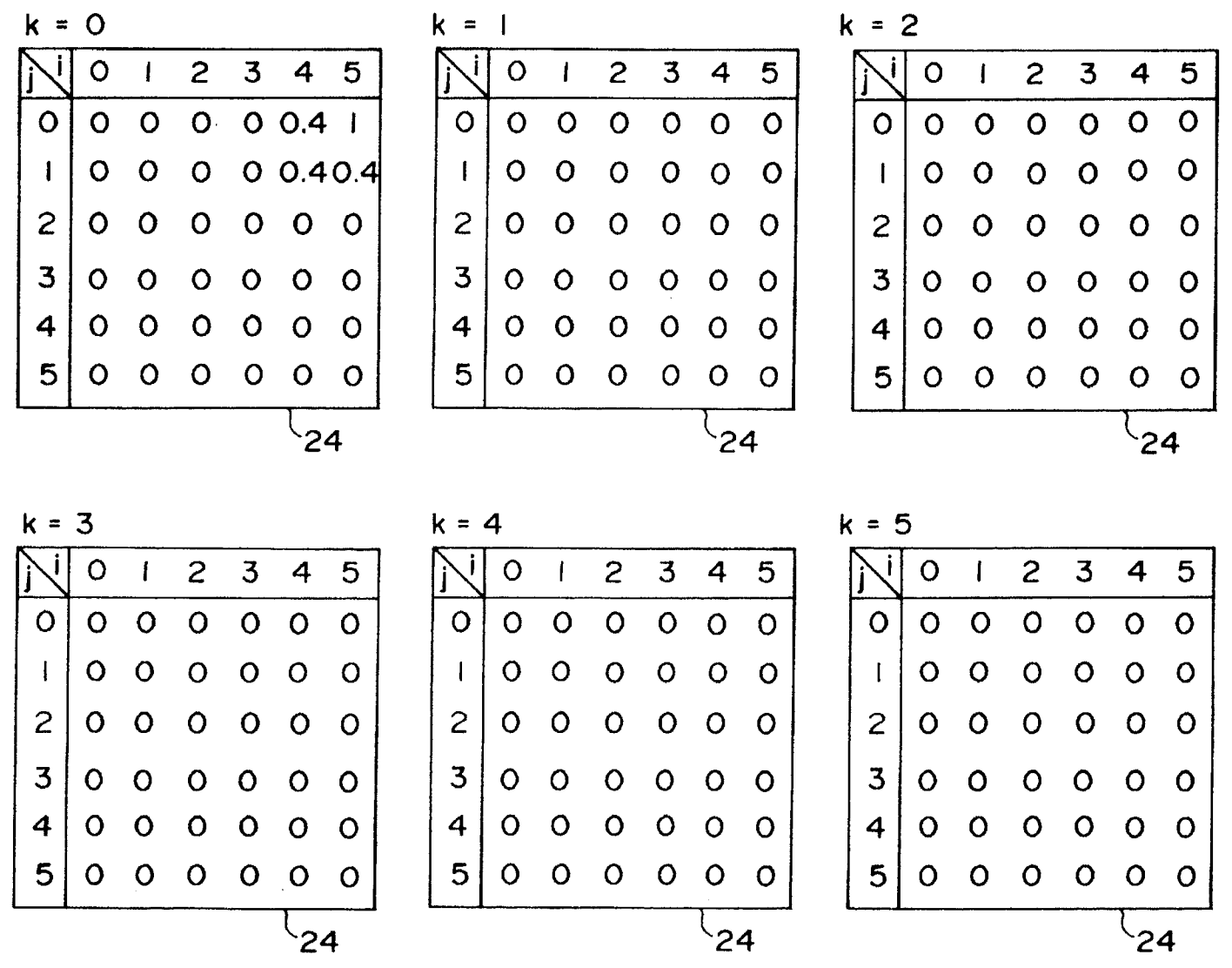

FIG. 25 is a flow chart for illustrating the evaluation table generating processing procedure 502. Referring to the figure, a counter i indicating the location of the R-color component fuzzy grade value 106 in the fuzzy grade table 19 is initialized in a step 600, while in a step 602, a counter j indicating the location of the B-color component fuzzy grade value 108 is initialized. Further, in a step 604, a counter k indicating the location of the B-color component fuzzy grade value 110 is initialized. In a step 606, minimum values are determined for the fuzzy grade value of the i-th R-color component, the fuzzy grade value of the j-th G-color component and the fuzzy grade value of the k-th B-color component, respectively, and stored at locations i, j and k in the evaluation table 24 in a step 608. This processing is repeated through triplicate loops until the i, j and k assume, respectively, the gradation division number or divisor of "16" (steps 608 to 618). FIG. 26 shows examples of the evaluation table 24 obtained as the result of the processing mentioned above.

Figure 27:
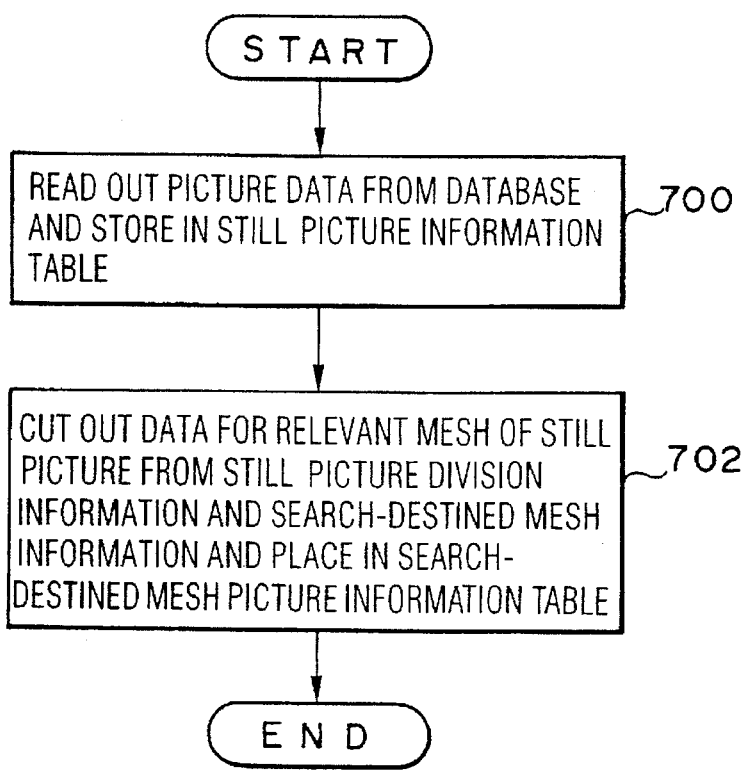
FIG. 27 is a flow chart for illustrating a still picture division processing procedure.

FIG. 27 is a flow chart for illustrating the processing executed by the still picture division processing module 12. Referring to the figure, the still picture information is taken out from the database 6, and the file name thereof is stored in the user-oriented still picture data file identifier number column 136 of the still picture information table 25 in a step 700. Subsequently, by referencing the still picture division information table 21 and the search-destined mesh picture information area 22, the picture information of the mesh of concern is cut out from the still picture data to be stored in the search-destined mesh picture information table 26 (step 702).

Figure 28:
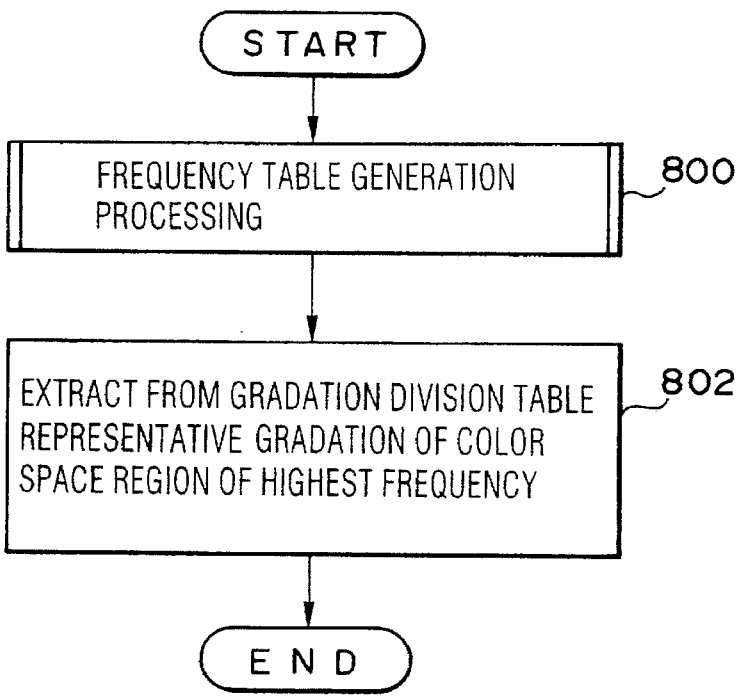
FIG. 28 is a flow chart for illustrating a representative color component extraction processing procedure.

FIG. 28 is a flow chart for illustrating the processing executed by the representative color component extraction processing module 13. Referring to the figure, the frequency table 27 indicating histograms of the color components for the individual pixels (or picture elements) within the mesh of concern is created for each of the color space regions resulting from the division (step 800). Concerning, the frequency table creation processing 800, description will be made hereinafter. Subsequently, the color space region exhibiting the highest frequency is selected, and the representative gradation of the selected color space region is read out from the gradation division table 23 to be stored in the representative color component value table 28 (step 802).

Figure 29:
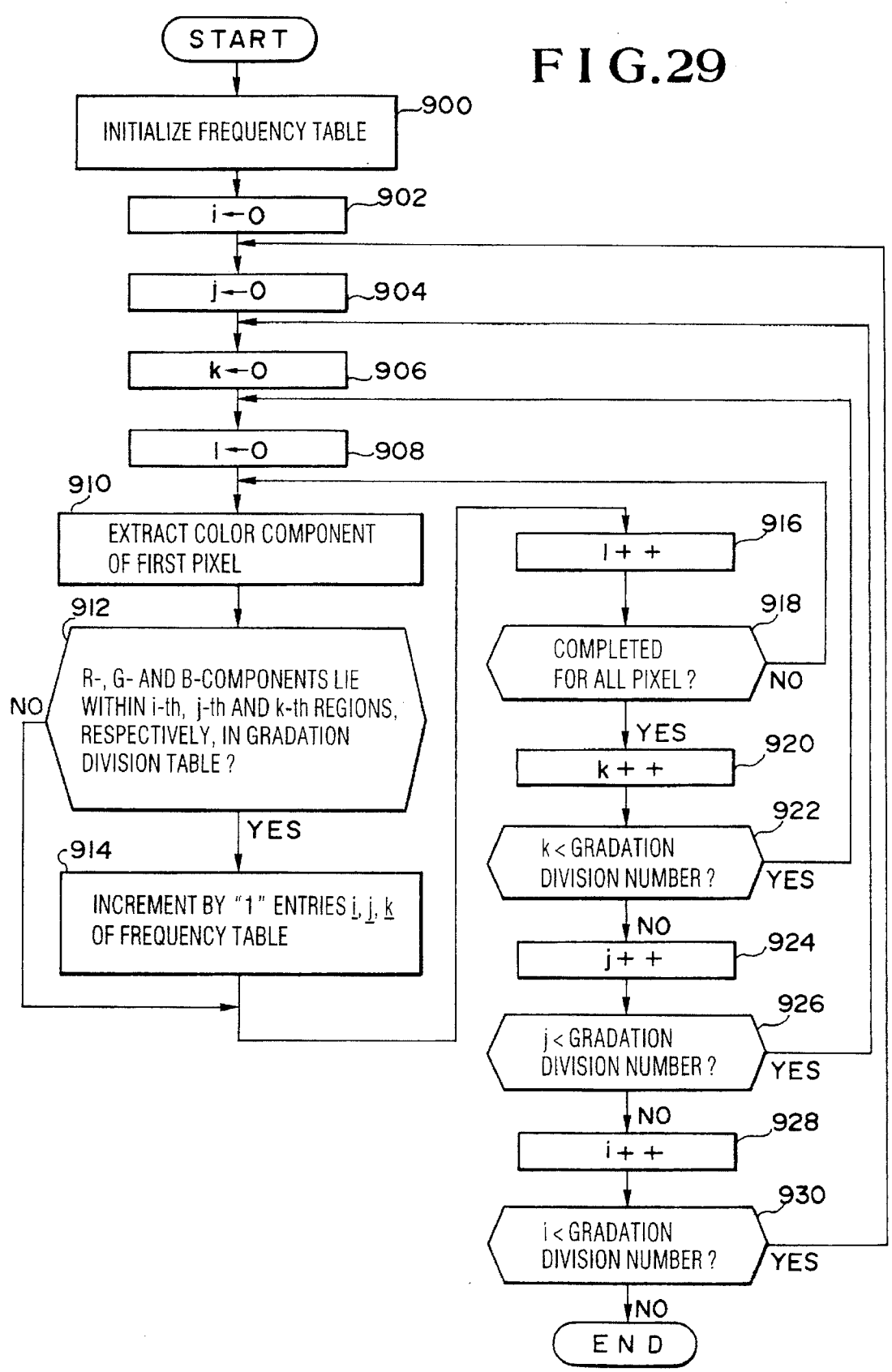
FIG. 29 is a flow chart for illustrating a frequency table generation processing procedure.

FIG. 29 is a flow chart for illustrating the frequency table creation processing 800 mentioned above. At first, the elements of the frequency table 27 are initialized (step 900), whereupon the three independent counters indicating the location of the gradation division table 23, i.e., the counter i (indicating the R-region), the counter j (indicating the G-region), and the counter k (indicating the B-region) are initialized in steps 902, 904 and 906, respectively, while in a step 908, a counter l indicating the pixel (or picture element) within the mesh of concern is initialized. In succession, the color component of the first pixel within the mesh of concern is extracted in a step 910. Subsequently, decision is made as to whether or not the color component as extracted is included in the color space regions created by the gradation regions of the gradation division table 23 indicated by the counters i, j and k, respectively, in a step 912. More specifically, when the R-color component of the first pixel has a gradation level greater than that of the start point of the i-th region in the gradation division table 23 and smaller than that of the end point of the same region i and when the G-color component of the first pixel has a gradation level greater than that of the start point of the j-th region in the gradation division table 23 and smaller than that of the end point of the same and when the B-color component of the first pixel has a gradation value greater than that of the start point of the k-th region of the gradation division table 23 and smaller than that of the end point of the same, the elements i, j and k in the frequency table 27 are each incremented by "one" in a step 914. This processing step is repetitively executed for all the pixels within the mesh of concern (loop 910 to 918). Further, the processing procedure described above is repeated through a triplicate loop 904 to 930) until each of the elements or counters i, j and k has attained the gradation division number (divisor) of "16".

Figure 30:
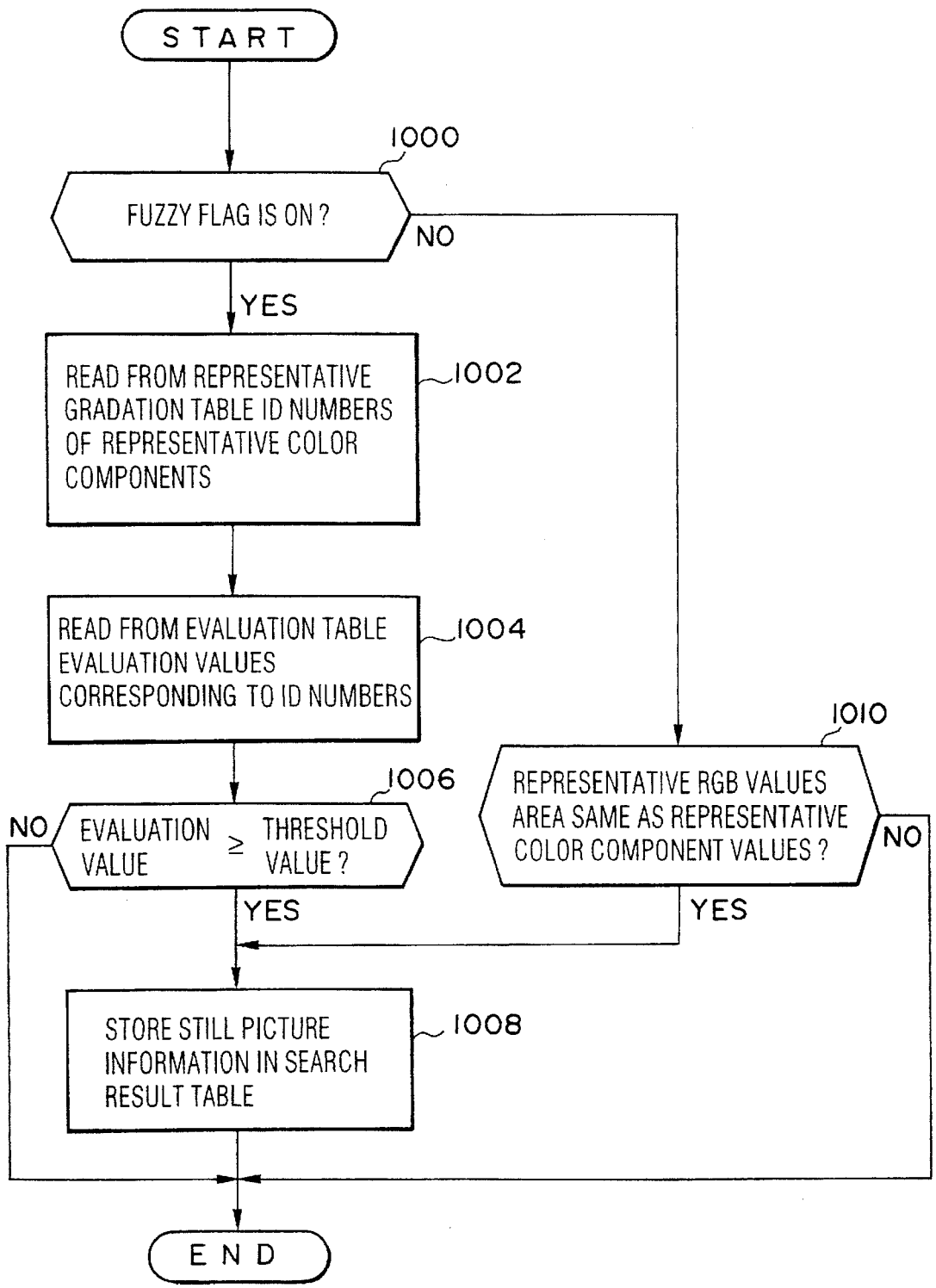
FIG. 30 is a flow chart for illustrating a search execution processing procedure.

FIG. 30 is a flow chart for illustrating the processing executed by the search execution processing module 14. Referring to the figure, it is first decided in a step 1000 whether or not the fuzzy flag is on. If so, the identifier numbers 100 corresponding to the color components in the representative color component value table 28 are determined by referencing the representative gradation value table 17 in a step 1002. Then, the elements corresponding to the identifier numbers 100 are determined on the basis of the evaluation table 24 to be stored as the evaluation value 29 in a step 1004. The evaluation value 29 thus obtained is compared with the threshold value 30 determined previously as the reference value (step 1006). When the comparison results in that the evaluation value 29 is greater than the threshold value (reference value) 30 inclusive, the corresponding still picture is determined as the still picture which satisfies the search conditions. Accordingly, the database-oriented still picture identifier number 134 and the user-oriented still picture data file identifier number 136 of that still picture as contained in the still picture information table 25 are stored in the search result table 31 at the corresponding columns, respectively, in a step 1008. On the other hand, when the fuzzy flag is found to be off in the step 1000, it is decided in a step 1010 whether or not the value of the representative color component (RGB) value table 20 coincides with that of the representative color component value table 28. When coincidence is found (step 1010), the corresponding still picture is determined as the still picture which satisfies the search conditions, whereupon the still picture identifier number 134 and the still picture data file identifier number 136 of that still picture as contained in the still picture information table 25 are stored in the search result table 31 at the corresponding columns, respectively, in a step 1008.

Figure 31:
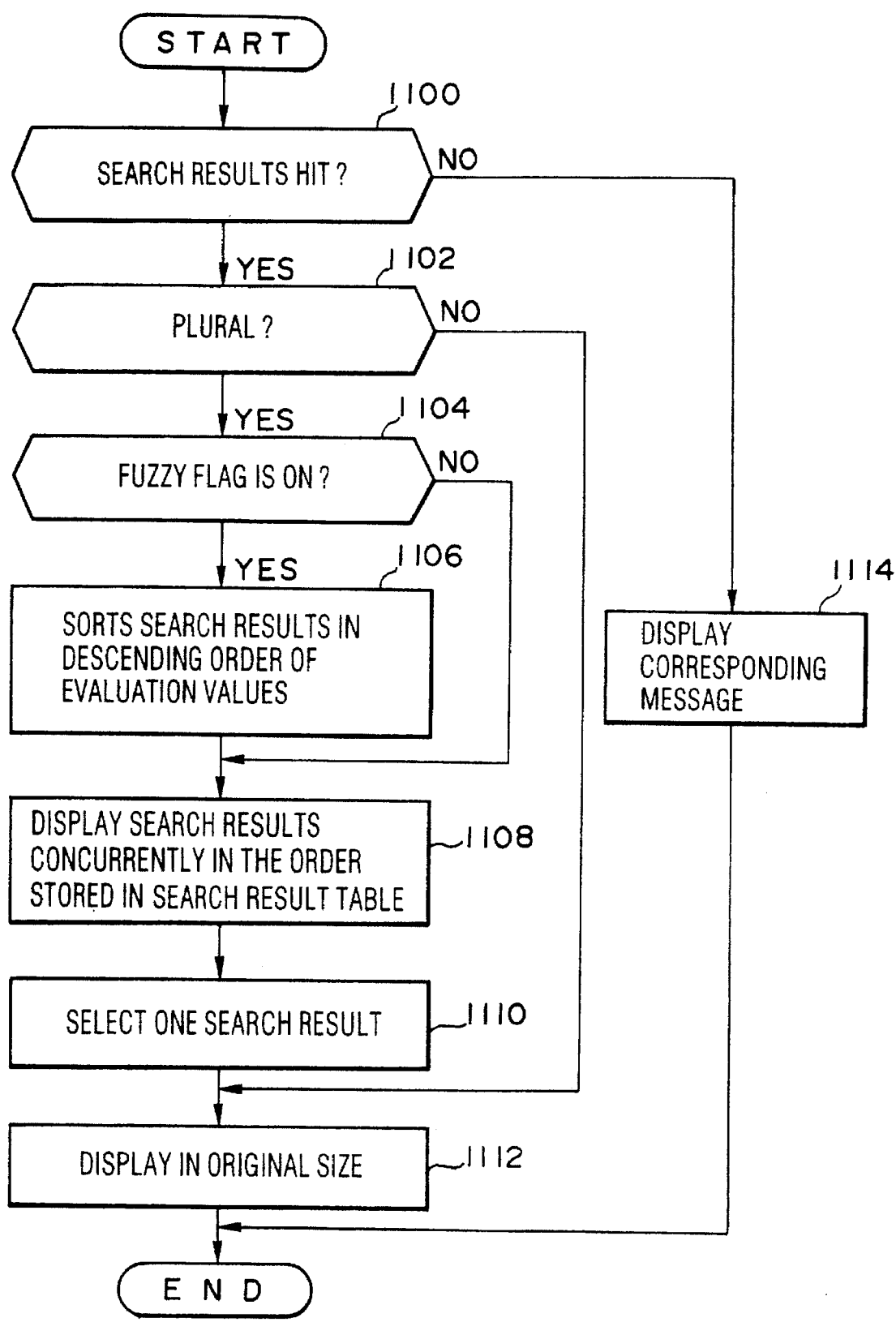
FIG. 31 is a flow chart for illustrating a searched still picture display processing procedure.
Figure 32:
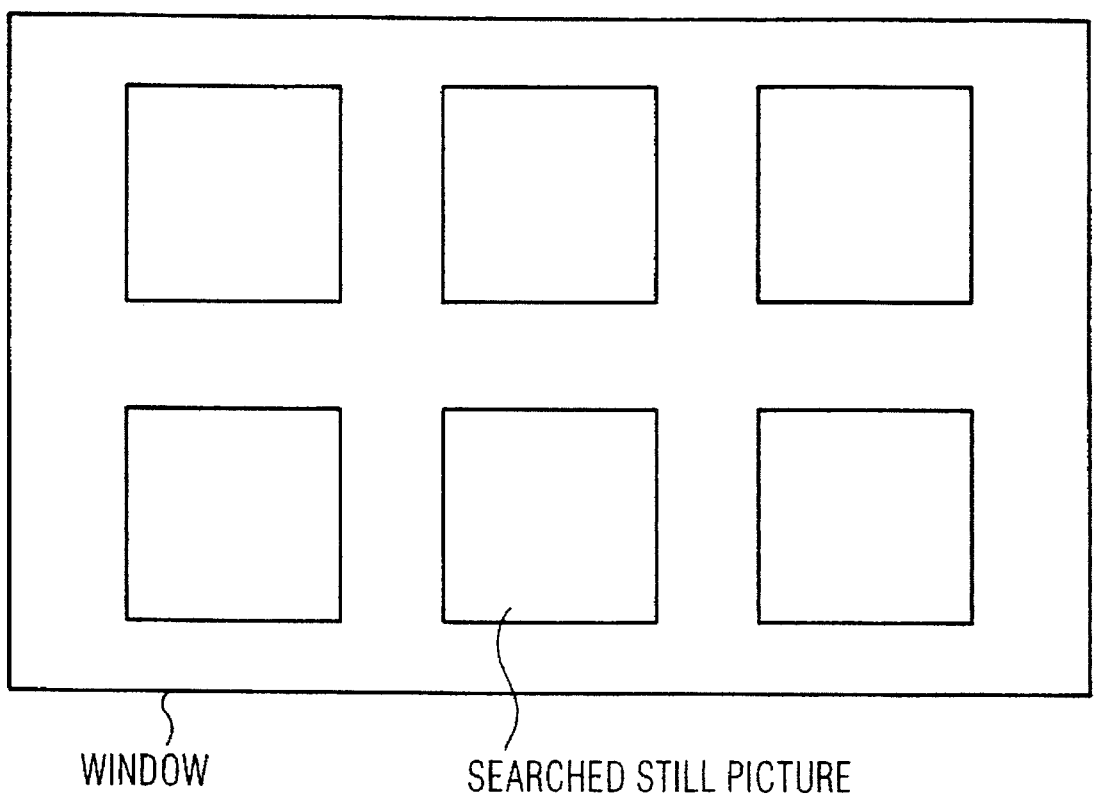
FIG. 32 is a view for illustrating an exemplary display of searched still pictures in contraction in a descending order of evaluation values, starting from a left top one.

FIG. 31 is a flow chart for illustrating the processing executed by the searched still picture display processing module 15. In a step 1100, it is first decided whether or not any result of the search or retrieval is available. Unless no result is derived from the search, a message which may read "still picture as designated is absent" is displayed on the display unit 3 in a step 1114, whereupon the search procedure comes to an end. On the other hand, when the decision step 1100 results in affirmation (Yes), it is then decided in a step 1102 whether or not a plurality of results are obtained. When the result of search is only one, the still picture stored in the search result table 31 is displayed in the original size (step 1112). On the other hand, when there exist plural results (i.e., when the answer of the decision step 1102 is affirmative), it is then checked in a step 1104 whether the fuzzy flag is on. If so, the contents in the individual rows of the search result table 31 are sorted in a descending order of the evaluation values 158 contained in the search result table 31 (step 1106). On the other hand, when the fuzzy flag is off, no sorting is performed, and the plural still pictures are displayed in a contracted size sequentially on the display unit 3, starting from a top left concern thereof, in the order in which they are stored in the search result table 31 (step 1108). When one of still pictures is selected from those being displayed, the selected still picture is then displayed in the original size on the display unit 3 (step 1112). FIG. 32 shows an exemplary display of the still pictures resulting from the search.

According to the concept of the invention incarnated in the embodiment described above, search of a still picture as designated can be accomplished without any omission by virtue of the feature that the color components of the pixels of the still picture are extracted only from a region thereof in which the thing of concern is contained by dividing the still picture into rectangular meshes. Besides, the search for other thing than that of concern can be accomplished in dependence on the designation of location or position of the mesh divisions. Suppose, by way of example, a still picture of "a person wearing a red dress and standing in front of a white building under the blue sky". In that case, even when the thing inherently of concern is the dress, other still picture containing "blue sky" can be searched by changing the location of the mesh for designation.

Further, since the primary color "red" is represented in terms of the fuzzy quantity in the search/retrieval system according to the embodiment described above, it is possible to search concurrently the colors which can not be regarded as "red" in the strict sense of definition as well as colors which approximate to "red" such as "reddish", so to say, so far as the evaluation value exceeds the reference or threshold value. In other words, flexible color picture search can be realized in dependence on the degree of fuzziness or ambiguity determined by the searcher.

A feature of the still picture search described above can be seen in that histogram is made use of for extracting the representative color component. In other words, the color component making appearance within the mesh of concern with a highest frequency is determined as the representative color component. More specifically, because only the color component of high frequency is taken into account, there may arise a problem that the still picture of concern can not be searched nevertheless of satisfaction of the search conditions although it depends on the location of the mesh under search as designated. To be more concrete, in the case where the thing of concern is scarcely included in the mesh under search, frequency of the color components of the things to be put aside from the consideration (such as, for example, background or the like attributes) will become higher than the frequency of the color component of the thing of concern. Under the circumstances, in the case where the color of the thing of concern in a still picture undergoing the search processing satisfies the search conditions while the color of the thing to be out of consideration does not satisfy the search conditions, the still picture will not be retrieved. On the contrary, in the case where the color of the thing of concern does not satisfy the search conditions with the thing to be put aside from of consideration satisfying the search conditions, the still picture will be retrieved. In the later case, not only the desired still picture but also undesired one will be retrieved to wastefulness, which does not however give rise to serious problem because the appropriate still picture can be retrieved. By contrast, in the former case, the still picture to be intrinsically retrieved is omitted from the retrieval, which of course means that the search system suffers from a serious drawback.

In order to solve the problem mentioned above, it is required to perform again the search processing by changing designation of the mesh location or to alternatively increase the number of divisions to reduce the size of the mesh for repeating the search processing, starting from the location as described. In this conjunction, it is however noted that the operator or user in general has neither sufficient knowledge about the search process nor the identity of the still picture itself to be retrieved, not to say of presence thereof in the database. Thus, the searcher is not in the position to know whether the search as carried out is accompanied with the omission from retrieval.

In order to cope with the problem mentioned above, it is taught according to another aspect of the invention that instead of evaluation of only the representative color component determined on the basis of histogram, color components of all the pixels within the mesh under search are evaluated to thereby determine a mean value of the evaluation values as obtained, wherein the mean value thus determined is made use of as the evaluation value for the search of the relevant still picture in the representative color component extraction processing module 13 and the search execution processing module 14.

Figure 33:
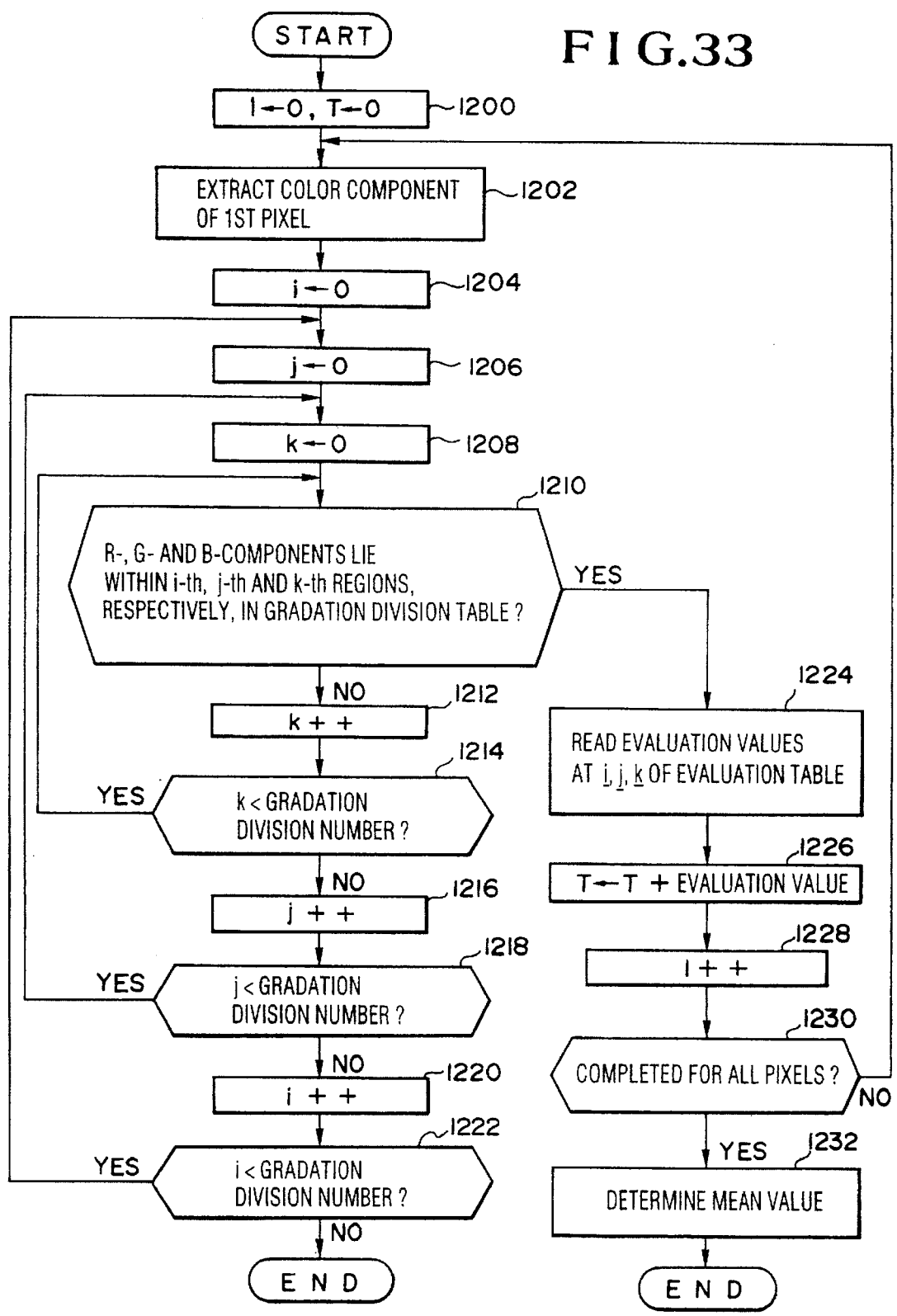
FIG. 33 is a flow chart for illustrating a processing procedure for determining a mean value of color components of pixels located within a designated mesh.

FIG. 33 is a flow chart for illustrating a processing procedure to this end.

Referring to the figure, a counter 1 indicating the pixel in a mesh under search and a variable T for incrementing the evaluation value on a pixel-by-pixel basis are initialized in a step 1200. Subsequently, in a step 1202, a color component of the first pixel in the mesh of concern in a still picture is extracted. Thereafter, three independent counters indicating locations of the gradation division table 23 (i.e., the counter i indicating the R-region, the counter j indicating the G-region and the counter k indicating the B-region) are initialized in steps 1204, 1206 and 1208, respectively. In succession, color space regions which contain the color components as extracted are determined through a loop including steps 1204 to 1222. More specifically, through the triplicate loop, the processing is repeated until the counters i, j and k have reached the gradation division number of "16", respectively. In other words, when the color component R of the first pixel assumes a gradation value greater than that of the start point of the i-th region of the gradation division table 23 and smaller than that of the end point while the color component R of the first pixel assumes a gradation value greater than that of the start point and smaller than that of the end point in the j-th region of the gradation division table 23 and when the color component B of the first pixel assumes a gradation value greater than that of the start point of the k-th region of the gradation division table 23 and smaller than that of the end point thereof, the processing exits from the above-mentioned triplicate loop, whereupon the processing in a step 1224 is executed. In this steps 1224, the elements i, j and k are determined from the evaluation table 24 as the evaluation values, which are then added to the value in the counters T (step 1226).

The processing through the steps 1202 to 1230 mentioned above is performed for all the pixels located within the mesh under search. By dividing the value of the counter T by the number of pixels found within the mesh under search, a mean value is determined as the evaluation value 29 for the still picture having that mesh. Subsequently, the evaluation value 29 is compared with the threshold value 30 determined previously. Information of the still picture for which the evaluation value 29 is greater than the threshold value (reference value) 30 inclusive is stored in the search result table 31 as the picture information which satisfies the search conditions.

According to the procedure described above, evaluation is performed for the color components of all the pixels within the mesh under search. Thus, the color component of lesser frequency can be taken into consideration, whereby omission from the retrieval can be reduced or suppressed.

In the case of the embodiment described above, the evaluation values for all the pixels within the mesh under search are averaged. Accordingly, when many things of no concern having colors which do not satisfy the search conditions (i.e., many pixels of the evaluation value "0") are included within the mesh under search, the mean value of the evacuation is lowered even in the case where the color of the thing of concern satisfies the search conditions. In that case, when the evaluation value is smaller than the threshold value (reference value), no still picture is found as the result of the search even when the color of the thing of concern satisfies the search conditions, although it depends on the location of the mesh as designated.

In this case, a mean value is determined only on the basis of the pixels having the evaluation values greater than "0". In this way, by taking into consideration only the pixels having the evaluation values greater than "0", the relevant still picture can be retrieved without fail even when the frequency or number of the pixels which has the colors satisfying the search conditions is small. Thus, the problem of omission from the retrieval mentioned hereinbefore can satisfactorily be solved.

As will now be understood from the foregoing description, according to the invention which teaches the search/retrieval of still pictures on the basis of the location and the color by extracting the representative color component from a designated region in a still picture, it is possible for the operator to extract the representative color component of the thing of concern, whereby still picture retrieval can be accomplished without unwanted omission from the retrieval.

Besides, by virtue of automatic extraction of the attribute "color" from the still picture under search, it becomes unnecessary to prepare previously the search indexes for the database, whereby the amount of data to be stored can correspondingly be reduced.

Additionally, by representing the color in terms of fuzzy quantity, definition of color can be made with a certain width or margin for allowing ambiguity or fuzziness to be taken into consideration, whereby still picture search can be accomplished with high flexibility.

Furthermore, when a plurality of search results are obtained, corresponding still pictures can be displayed on the display unit in the form of a list in the order of the evaluation values. Thus, the still picture which has color satisfying at least the color demanded by the search conditions can easily be discriminated at a glance, whereby the desired still picture can be selected without any difficulty.

The invention claimed is:

1. A still picture search/retrieval system for selectively searching a particular still picture of concern from a plurality of still pictures stored in a database on the basis of a color designated as a search condition and displaying said particular still picture retrieved as the result of the search, comprising:

input means for inputting color data-related information concerning a color designated as the search condition for performing said search and region-related information concerning a region of each of said still pictures designated for performing said search;

search means for selecting from each of said still pictures a search-destined region for which the search is to be actually performed on the basis of said region-related information, determining a representative value of the color data of each of said still pictures on the basis of the color data of said selected search-destined region and deciding whether or not said representative value satisfies conditions determined on the basis of said color data-related information to thereby decide whether or not any hit still picture exists;

display means for displaying said hit still picture as the still picture retrieved as the result of said search;

said search means being provided availably with a plurality of search methods each for deciding whether or not said representative value satisfies said search conditions determined on the basis of said color data-related information to thereby decide whether or not any hit still picture exists;

wherein a command indicating which one is to be selected from said plurality of search methods is inputted through said input means;

wherein said search means performs the still picture search in accordance with said selected search method;

said region-related information including region division information for dividing each of the search-designated still pictures into a plurality of regions and search-destined region designating information for designating the search-destined region from the regions resulting from said division;

still picture dividing means for dividing each of said still pictures into a plurality of regions in accordance with said region division information;

wherein said search means includes:
representative color component extracting means for determining a representative value of the color data for each of said still pictures on the basis of the color data of said region designated by said search-destined region designating information; and search execution means for determining evaluation values for said still pictures, respectively, on the basis of said color data-related information and said representative values of the color data of said still pictures, respectively, to thereby output said still pictures in a descending order of said evaluation values;

wherein said display means displays said still pictures retrieved by said search execution means in a descending order of said evaluation values.

2. A still picture search/retrieval system according to claim 1, said color data including color component data for a plurality of color components constituting said color; and said color component data being divided into a plurality of groups in dependence on sizes of said color component data;

wherein upon determining said representative value of said color data, histogram of the color data contained in said search-destined region is determined to thereby determine the color data of a highest frequency as said representative value; and wherein upon determination of said histogram, the color data are regarded to be identical with one another when all of said plurality of color component data constituting each of said color data belong to a same one of said color component data groups.

3. A still picture search/retrieval system according to claim 1, said color data including color component data for a plurality of color components constituting said color data;

said color component data being divided into a plurality of color component groups on a basis of said color component data per se;

said input means being inputted with fuzzy degrees representing degrees of similarity of the designated color to each of said color component groups; and said search means determining the color component data corresponding to said representative value of said determined color data for deriving a fuzzy evaluation value of the representative value of said color data on the basis of the said fuzzy degrees for said color component data, to thereby retrieve a particular still picture on the basis of said fuzzy evaluation value.

4. A still picture search/retrieval system for selectively searching a particular still picture of concern from a plurality of still pictures stored in a database on the basis of a color designated as a search condition and displaying said particular still picture retrieved as the result of the search, comprising:

input means for inputting color data-related information concerning a color designated as the search condition for performing said search and region-related information concerning a region of each of said still pictures designated for performing said search;

search means for selecting from each of said still pictures a search-destined region for which the search is to be actually performed on the basis of said region-related information, determining a representative value of the color data of each of said still pictures on the basis of the color data of said selected search-destined region and deciding whether or not said representative value satisfies conditions determined on the basis of said color data-related information to thereby decide whether or not any hit still picture exists;

display means for displaying said hit still picture as the still picture retrieved as the result of said search said color data including color component data for a plurality of color components constituting said color data;

said color component data being divided into a plurality of color component groups on a basis of said color component data per se;

said input means being inputted with fuzzy degrees representing degrees of similarity of the designated color to each of said color component groups;

said search means determining the color component data corresponding to said representative value of said determined color data for deriving a fuzzy evaluation value of the representative value of said color data on the basis of the said fuzzy degrees for said color component data, to thereby retrieve a particular still picture on the basis of said fuzzy evaluation value; and retrieved still picture output means for outputting sequentially a plurality of still pictures, if retrieved, in a descending order of said fuzzy evaluation values;

wherein said display means displays said still pictures in a descending order of said fuzzy evaluation values.

5. A still picture search/retrieval method for selectively searching a particular still picture of concern from a plurality of still pictures stored in a database on the basis of a color designated as search condition and displaying said particular still picture retrieved through the search, said method comprising the steps of:

inputting color data-related information concerning a color designated as search condition for performing execution of said search and region-related information concerning a region of each of said still pictures designated for execution of said search;

selecting from each of said still pictures a search-destined region which is to be subjected to the search in accordance with said region-related information, determining a representative value of the color data of each of said still pictures on the basis of the color data of said selected search-destined region and deciding whether or not said representative value satisfies conditions determined on the basis of said color data-related information to thereby decide whether or not any hit still picture exists; and displaying said hit still picture as the still picture retrieved as the result of said search;

providing a plurality of search procedures each for deciding whether or not said representative value satisfies said conditions determined on the basis of said color data-related information to thereby decide whether or not any hit still picture exists;

inputting a command indicating which one is to be selected from said plurality of search procedures;

wherein the still picture search is executed in accordance with said selected search procedure;

wherein said region-related information includes region division information for dividing each of the search-designated still pictures into a plurality of regions and search-destined region designating information for designating selectively the search-destined region from the regions resulting from said division;

dividing each of said still pictures into a plurality of regions in accordance with said region division information;

determining a representative value of the color data for each of said still pictures on the basis of the color data of said region designated by said search-destined region designating information;

determining evaluation values for said still pictures, respectively, on the basis of said color data-related information and said representative values of the color data of said still pictures, respectively, to thereby retrieve and output said still pictures in a descending order of said evaluation values; and displaying said retrieved still pictures in a descending order of said evaluation values.

6. A still picture search/retrieval method according to claim 5, wherein said color data include color component data for a plurality of color components constituting each color;

further comprising the steps of:

dividing said color component data into a plurality of groups in dependence on sizes of said color component data; and determining histogram of the color data contained in said search-destined region upon determination of said representative value of said color data to thereby determine the color data of a highest frequency as said representative value;

wherein upon determination of said histogram, the color data are regarded to be identical with one another when all of said plurality of color component data constituting each of said color data belong to a same one of said color component data groups.

7. A still picture search/retrieval method according to claim 5, wherein said color data include color component data for a plurality of color components constituting each color;

further comprising the steps of:

dividing said color component data into a plurality of color component groups on a basis of said color component data;

inputting fuzzy degrees representing degrees of similarity of the designated color to said color component groups, respectively; and determining the color component data corresponding to said representative value of said determined color data for thereby deriving a fuzzy evaluation value of the representative value of said color data on the basis of the said fuzzy degrees for said color component data, to thereby retrieve a particular still picture on the basis of said fuzzy evaluation value.

8. A still picture search/retrieval method for selectively searching a particular still picture of concern from a plurality of still pictures stored in a database on the basis of a color designated as search condition and displaying said particular still picture retrieved through the search, said method comprising the steps of:

inputting color data-related information concerning a color designated as search condition for performing execution of said search and region-related information concerning a region of each of said still pictures designated for execution of said search;

selecting from each of said still pictures a search-destined region which is to be subjected to the search in accordance with said region-related information, determining a representative value of the color data of each of said still pictures on the basis of the color data of said selected search-destined region and deciding whether or not said representative value satisfies conditions determined on the basis of said color data-related information to thereby decide whether or not any hit still picture exists;

displaying said hit still picture as the still picture retrieved as the result of said search;

wherein said color data include color component data for a plurality of color components constituting each color;

dividing said color component data into a plurality of color component groups on a basis of said color component data;

inputting fuzzy degrees representing degrees of similarity of the designated color to said color component groups, respectively; and determining the color component data corresponding to said representative value of said determined color data for thereby deriving a fuzzy evaluation value of the representative value of said color data on the basis of the said fuzzy degrees for said color component data, to thereby retrieve a particular still picture on the basis of said fuzzy evaluation value;

outputting sequentially a plurality of still pictures, if retrieved, in a descending order of said fuzzy evaluation values; and displaying said still pictures in a descending order of said fuzzy evaluation values.

9. A still picture search/retrieval system for selectively searching a particular still picture of concern from a plurality of still pictures on the basis of a color designated as search condition and displaying said particular still picture retrieved as the result of the search, comprising:

an input unit for inputting information concerning search-destined color data and a search-destined region on the basis of which the search is to be performed;

a display unit for displaying results of the search;

a CPU including a command analysis module for analyzing commands inputted through said input means to thereby distribute said command to relevant processings, respectively, a search condition input processing module for inputting said color data information and an evaluation method selecting command, a still picture dividing method determination processing module for inputting a method for dividing said still picture into rectangular meshes of a same size, a divided mesh designation processing module for designating a search-destined mesh containing a thing which constitutes a subject for the search electively from the meshes resulting from said division, an evaluation method determination processing module for determining the evaluation procedure for the search on the basis of said search condition, a still picture division processing module for dividing said still picture in accordance with said inputted division method, a representative color component extraction processing module for extracting a representative color component of said search-destined mesh, a search execution processing module for selecting a still picture as the result of said search by evaluating said representative color component, and a searched still picture display processing module for displaying the searched still picture on said display unit;

a memory including an area for storing color gradation division numbers, a table for storing representative gradation values for said color gradation divisions, respectively, a fuzzy flag area having a flag indicating whether or not a fuzzy influence is to be employed in executing the search for the purpose of enabling still pictures of colors approximating the designated color to be retrieved, a table for storing fuzzy grades of inputted color components, respectively, when said fuzzy inference is to be employed for the search, a table for storing inputted gradation values serving as the representative color components when said fuzzy inference is not employed in the search, a still picture division information storing table for storing divisors for dividing the still picture in the vertical (heightwise) direction and in the horizontal (widthwise) direction, respectively, an area for storing locations of the designated regions in terms of identifier numbers, respectively, a table for storing the gradation values at starting points and end points of several ranges into which the color component gradation is to be divided, an evaluation table for storing Cartesian products of fuzzy sets inputted, a still picture information table for storing file names of still pictures extracted from a database, a search-destined mesh picture information table for storing still picture data of the search-destined meshes cut out from said still picture data, a frequency table for storing values of histogram, an area for storing an evaluation value corresponding to the representative color component value read out from said evaluation table, an area for storing a threshold value serving as a reference value for the search and determined previously in said system, and a search result table for storing results of the search; and a database storing said still pictures.

10. A still picture search/retrieval method for performing a search of a particular still picture on the basis of a color of concern from a plurality of still pictures in accordance with commands inputted through an input unit, said method comprising:

(a) a step of inputting color information as search condition and a method of dividing the still picture into rectangular meshes of a same size;

(b) a step of performing search condition input processing on the basis of said color information;

(c) a still picture division method determination processing step for determining a still picture dividing method on the basis of said division method;

(d) a divided mesh designation processing step for designating a mesh containing a thing constituting a subject for search from the meshes resulting from said division in said step (a) on the basis of the result of said still picture division method determination processing step (c);

(e) an evaluation method determination processing step for determining an evaluation method for the search on the basis of the color information inputted as the search condition;

(f) a still picture division processing step for dividing picture information extracted from a database in accordance with the division method determined in said still picture division method determination processing step (c) and cutting out picture information of the search-destined mesh designated in said divided mesh designation processing step (d);

(g) a representative color component extraction processing step for extracting a representative color component of the original still picture from the picture information of the search-destined mesh cut out in said still picture division processing step (f);

(h) a search execution processing step for determining the value of said representative color component in accordance with the evaluation method determined in said evaluation method determination processing step (e) for thereby retrieving said representative color component as the result of the search when said value is not smaller than a threshold value determined previously; and (i) a search result display processing step for displaying said retrieved still picture after execution of said still picture division processing step (f), said representative color component extraction processing step (g) and said search execution processing (h) for each of the still pictures.

11. A still picture search/retrieval method according to claim 10, said search condition input processing step (b) including the substeps of:

(b1) determining whether the fuzzy inference is to be adopted or not;

(b2) setting on said fuzzy flag when said fuzzy inference is determined to be adopted;

(b3) responding to the fuzzy flag set on for thereby storing in a fuzzy grade table fuzzy grade values indicating degrees of similarity of the representative gradation values of the color components (RGB), respectively, contained in the representative gradation table stored in said memory to said color of concern;

(b4) setting off said fuzzy flag when said fuzzy inference is determined not to be adopted; and (b5) responding to the fuzzy flag set off for thereby inputting the color constituting the search condition in terms of the representative gradation value thereof and storing it in the representative color component (RGB) table;

said still picture division method input processing step (a) including the substeps of:

(a1) designating the method of dividing the search-destined still picture into the meshes in terms of number of divisions in the vertical and horizontal directions, respectively;

(a2) placing said number of divisions in the vertical direction and said number of divisions in the horizontal direction as inputted in a still picture division information table secured on said memory for storing said numbers of divisions;

said divided mesh designation processing step (d) including the substeps of:

(d1) determining the number of divisions for the still picture on the basis of said still picture division information to thereby display on said display unit the still picture as divided; and (d2) designating the search-destined mesh and storing the identifier number of said designated search-destined mesh in a search-destined mesh picture information table;

said evaluation method determination processing step (e) including the substep of:

(e1) performing an evaluation table generation processing when said fuzzy flag is set on;

said still picture division processing step (f) including the substeps of:

(f1) extracting the still picture information from the database to thereby store file names thereof in a file name of a still picture information file name table; and (f2) cutting out picture information of the search-destined mesh from said still picture information on the basis of said still picture information and said search-destined mesh picture information for thereby storing the cut-out picture information in a search-destined mesh picture information table;

said representative color component extraction processing step (g) including the substep of:

(g1) generating a frequency table containing histograms of color components of individual pixels located within said search-destined meshes for divided color space regions, respectively;

said search execution processing step (h) including the substeps of:

(h1) responding to the fuzzy flag set on for thereby determining from said representative gradation table identifier numbers corresponding to each component of the representative color component values, respectively;

(h2) determining elements corresponding to said identifier numbers, respectively, from the evaluation table secured on said memory to thereby storing the determined elements in an evaluation table secured on said memory;

(h3) comparing the evaluation value as obtained with the threshold value determined previously;

(h4) responding to the result of said comparison indicating that said evaluation value is not smaller than the threshold value determined previously, for thereby storing the still picture identifier number and the file name of said still picture as relevant entries in the search result table secured on said memory by regarding said still picture as satisfying the search condition; and (h5) responding to the fuzzy flag set off for checking whether the representative color component (RGB) value is same as the representative color component value of a still picture, to thereby store the still picture identifier number and the file name of said still picture in the search result table as the relevant entries by deciding that said still picture satisfies the search condition; and said searched still picture display processing step (i) including the substeps of:

(i1) deciding whether or not the result of the search is obtained;

(i2) responding to absence of the search result for thereby displaying a corresponding message on said display unit;

(i3) responding to presence of the search result for thereby deciding whether or not a plurality of search results are obtained;

(i4) responding to the presence of a single search result for thereby displaying the still picture stored in said search result table in an original size;

(i5) responding to the presence of plural search results and the fuzzy flag set on for thereby sorting said plural search results in a descending order of the evaluation values contained in said search result table;

(i6) displaying the still pictures on said display unit in a reduced scale in the order in which said still pictures are stored in said search result table;

(i7) selecting one of the still pictures being displayed on said display unit; and (i8) displaying the selected still picture on said display unit in the original size.

* * * * *